(12) United States Patent
Shimizu

(10) Patent No.: US 6,199,963 B1
(45) Date of Patent: Mar. 13, 2001

(54) BRAKING FORCE CONTROL APPARATUS

(75) Inventor: Satoshi Shimizu, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/180,014

(22) PCT Filed: Apr. 25, 1997

(86) PCT No.: PCT/JP97/01465

§ 371 Date: Oct. 29, 1998

§ 102(e) Date: Oct. 29, 1998

(87) PCT Pub. No.: WO97/41020

PCT Pub. Date: Nov. 6, 1997

(30) Foreign Application Priority Data

Apr. 30, 1996 (JP) .................................................. 8-109548

(51) Int. Cl.$^7$ ........................................................ B60T 8/60

(52) U.S. Cl. ........................ 303/155; 303/116.2; 303/146; 303/900

(58) Field of Search ........................... 303/114.1, 116.2, 303/10, 11, 146, 900, 155

(56) References Cited

U.S. PATENT DOCUMENTS

| 4,824,181 | * | 4/1989 | Tomala ................................. 303/84.2 |
|---|---|---|---|
| 5,158,343 | | 10/1992 | Reichelt et al. . |
| 5,261,730 | | 11/1993 | Steiner et al. . |
| 5,350,225 | * | 9/1994 | Steiner et al. ..................... 303/113.4 |
| 5,367,942 | | 11/1994 | Nell et al. . |
| 5,427,442 | | 6/1995 | Heibel . |
| 5,445,444 | | 8/1995 | Rump et al. . |
| 5,492,397 | | 2/1996 | Steiner et al. . |
| 5,496,099 | | 3/1996 | Resch . |
| 5,499,866 | | 3/1996 | Brugger et al. . |
| 5,513,906 | | 5/1996 | Steiner . |
| 5,535,123 | | 7/1996 | Rump et al. . |
| 5,549,369 | | 8/1996 | Rump et al. . |
| 5,556,173 | | 9/1996 | Steiner et al. . |
| 5,564,797 | | 10/1996 | Steiner et al. . |
| 5,567,021 | * | 10/1996 | Gaillard .............................. 303/114.1 |
| 5,584,542 | | 12/1996 | Klarer et al. . |
| 5,586,814 | | 12/1996 | Steiner . |
| 5,609,401 | * | 3/1997 | Johnston et al. ..................... 303/155 |
| 5,658,055 | | 8/1997 | Dieringer et al. . |
| 5,660,448 | | 8/1997 | Kiesewetter et al. . |
| 5,669,676 | | 9/1997 | Rump et al. . |
| 5,709,438 | * | 1/1998 | Isakson et al. ..................... 303/113.4 |
| 5,719,769 | | 2/1998 | Brugger et al. . |
| 5,720,532 | | 2/1998 | Steiner et al. . |
| 5,772,290 | | 6/1998 | Heibel et al. . |
| 5,775,782 | * | 7/1998 | Akita et al. ............................ 303/10 |
| 5,816,668 | * | 10/1998 | Heubner ............................ 303/116.2 |
| 5,954,406 | * | 9/1999 | Sawada ........................... 303/122.09 |

FOREIGN PATENT DOCUMENTS

| 0711695 | 5/1996 | (EP) . |
|---|---|---|
| 2282649 | 4/1995 | (GB) . |
| 2295209 | 5/1996 | (GB) . |
| 61-268560 | 11/1986 | (JP) . |
| 3-227766 | 10/1991 | (JP) . |
| 4-121260 | 4/1992 | (JP) . |
| 5-97022 | 4/1993 | (JP) . |
| 7-165038 | 6/1995 | (JP) . |
| 7-329766 | 12/1995 | (JP) . |
| 8-34326 | 2/1996 | (JP) . |
| 8-40229 | 2/1996 | (JP) . |
| 8-91196 | 4/1996 | (JP) . |
| 8-295224 | 11/1996 | (JP) . |
| WO96/06763 | 3/1996 | (WO) . |

\* cited by examiner

*Primary Examiner*—Christopher P. Schwartz
*Assistant Examiner*—Devon Kramer
(74) *Attorney, Agent, or Firm*—Kenyon & Kenyon

(57) ABSTRACT

A normal control in which a master cylinder 32 is used as a hydraulic source to increase a wheel cylinder pressure and a brake assist control in which a pump 12 and an accumulator 20 are used as the hydraulic source the wheel cylinder pressure is increased in a state where communication between the master cylinder 32 and the wheel cylinder 44\*\* is intercepted are executed. When a termination request for the brake assist control occurs, first, the wheel cylinder pressure decreased. After the wheel cylinder pressure is decreased enough, communication between the wheel cylinder 44\*\* and the master cylinder 32 is restored.

5 Claims, 10 Drawing Sheets

FIG. 10

| CONTROL \ SOLENOID | NORMAL CONTROL | | | | BA CONTROL | | | | VSC CONTROL | | | |
|---|---|---|---|---|---|---|---|---|---|---|---|---|
| | ABS OFF | ABS ON | | | ABS OFF | ABS ON | | | NOT-CONTROLLED WHEEL | CONTROLLED WHEEL | | |
| | | INCREACE | HOLD | DECREACE | | INCREACE | HOLD | DECREACE | | INCREACE | HOLD | DECREACE |
| STR | OFF | | | | ON | | | | ON | | | |
| SA-1 ~SA-3 | OFF | ON | | | ON | | | | OFF | ON | | |
| S..H HOLDING SOLENOID | OFF (OPEN) | | ON (CLOSED) | | OFF (OPEN) | | ON (CLOSED) | | OFF (OPEN) | | ON (CLOSED) | |
| S..H PRESSURE DECREACING SOLENOID | OFF (CLOSED) | | | ON (OPEN) | OFF (CLOSED) | | | ON (OPEN) | OFF (CLOSED) | | | ON (OPEN) |

FIG. 11

| CONTROL \ SOLENOID | NORMAL CONTROL | | | | BA CONTROL | | | | VSC CONTROL | | | |
|---|---|---|---|---|---|---|---|---|---|---|---|---|
| | ABS OFF | ABS ON | | | ABS OFF | ABS ON | | | NOT-CONTROLLED WHEEL | CONTROLLED WHEEL | | |
| | | INCREACE | HOLD | DECREACE | | INCREACE | HOLD | DECREACE | | INCREACE | HOLD | DECREACE |
| SC | OFF (OPEN) | | | | ON (CLOSED) | | | | OFF (OPEN) | ON (CLOSED) | | |
| SA | OFF (OPEN) | | | | OFF (OPEN) | | | | ON (CLOSED) | OFF (OPEN) | | |
| SCH | OFF (CLOSED) | | | | ON (OPEN) | | | | ON (OPEN) | | | |
| PUMP | OFF | ON | | | ON | | | | ON | | | |
| S..H HOLDING SOLENOID | OFF (OPEN) | | ON (CLOSED) | | OFF (OPEN) | | ON (CLOSED) | | OFF (OPEN) | | ON (CLOSED) | |
| S..H PRESSURE DECREACING SOLENOID | OFF (CLOSED) | | | ON (OPEN) | OFF (CLOSED) | | | ON (OPEN) | OFF (CLOSED) | | | ON (OPEN) |

BRAKING FORCE CONTROL APPARATUS

FIELD OF THE INVENTION

The present invention relates to a braking force control apparatus, and more particularly to a braking force control apparatus in which a master cylinder and a high pressure source are provided as a hydraulic source.

BACKGROUND OF THE INVENTION

Conventionally, a braking force control apparatus in which a braking force greater than that in a normal case is generated when an emergency braking operation is required has been known, as disclosed in Japanese Laid-Open Patent Application No. 4-121260. The conventional apparatus has a brake booster generating a pressure into which a brake pedaling force $F_p$ is boosted with a predetermined servo ratio. The pressure from the brake booster is transferred to the master cylinder. The master cylinder then generates a master cylinder pressure $P_{M/C}$ corresponding to the pressure generated by the brake booster, that is, corresponding to the brake pedaling force $F_p$.

In addition, the conventional apparatus has a hydraulic pressure generating mechanism, including a pump as a hydraulic pressure source, generating an assist hydraulic pressure. The hydraulic pressure generating mechanism generates the assist hydraulic pressure based on a driving signal supplied from a control circuit. When the brake pedal is operated at a speed greater than a predetermined speed, the control circuit determines that a driver carries out the emergency braking operation and outputs the driving signal for requesting a maximum assist hydraulic pressure to the hydraulic pressure generating mechanism. The assist hydraulic pressure generated by the hydraulic pressure generating mechanism is supplied to the master cylinder and a change valve. Due to switching operation of the change valve, a higher one of the assist hydraulic pressure generated by the hydraulic pressure generating mechanism and the master cylinder pressure $P_{M/C}$ is alternatively supplied to wheel cylinders.

According to the above conventional apparatus, when the brake pedal is operated at a speed equal to or less the predetermined speed, the master cylinder pressure $P_{M/C}$ which is controlled to a hydraulic pressure corresponding to the brake pedaling pressure $F_P$ is supplied to the wheel cylinders. Hereinafter, a control in such a state is referred to as a normal control. In addition, when the brake pedal is operated at a speed greater than the predetermined speed, a high assist hydraulic pressure from the pump which is the hydraulic pressure source is supplied to the wheel cylinders. Hereinafter, a control in such a state is referred to as a brake assist control. Thus, according to the above conventional apparatus, the braking force is controlled based on the bake pedaling force $F_P$. Further, after the emergency braking operation is detected, the braking force can be rapidly increased.

In the above conventional apparatus, to terminate the brake assist control and resume the normal control, it is necessary to switch the change valve so that the hydraulic pressure source for the wheel cylinders is changed from the hydraulic pressure generating mechanism to the master cylinder. The brake assist control is a control for generating a wheel cylinder pressure $P_{W/C}$ sufficiently greater than the master cylinder pressure $P_{M/C}$ when the emergency braking operation is carried out. Thus, when the terminating request of the brake assist control occurs, there may be a great difference between the wheel cylinder pressure $P_{W/C}$ and the master cylinder pressure $P_{M/C}$.

In a case where the wheel cylinder pressure $P_{W/C}$ greater than the master cylinder pressure $P_{M/C}$ is generated in the wheel cylinders, when the hydraulic pressure source for the wheel cylinders is switched from the hydraulic pressure generating mechanism to the master cylinder, a brake fluid having a high pressure flows backward from the wheel cylinders to the master cylinder. The brake fluid flowing back to the master cylinder passes through the master cylinder and enters a reservoir tank. This phenomenon is not preferable in that unnecessary load is applied to the master cylinder and the pressure in wheel cylinders is prevented from being rapidly decreased.

SUMMARY OF THE INVENTION

The present invention has been made in view of the above point, and an object of the present invention is to provide a braking force control apparatus which can terminate the brake assist control without causing the brake fluid stored in the wheel cylinders at a high pressure during the brake assist control to flow back to the master cylinder.

The above object of the present invention is achieved by a braking force control apparatus which executes a normal control and a brake assist control, said normal control using a master cylinder as a hydraulic source to increasing a wheel cylinder pressure, said brake assist control using a high pressure source as the hydraulic source to increasing the wheel cylinder pressure in a state in which communication between said master cylinder and said wheel cylinder is intercepted, characterized in that there is provided: termination means for restoring the communication between said master cylinder and said wheel cylinder after wheel cylinder pressure is decreased so as to terminate said brake assist control when a termination request for said brake assist control occurs.

In the above constitution, while the normal control is being executing, the wheel cylinder communicates with the master cylinder. In addition, while the brake assist control is being executing, the communication between the wheel cylinder and the master cylinder is intercepted and the wheel cylinder is joined to the high pressure source. In the brake assist control, the high pressure source is used as the hydraulic source to increase the wheel cylinder pressure. As a result, in the brake assist control, there is a case where a pressure greater than the master cylinder is generated in the wheel cylinder. The termination control means decreases the wheel cylinder before the brake assist control is terminated. Thus, when the brake assist control is terminated and the wheel cylinder communicates with the master cylinder, a brake fluid having a high pressure does not flow back from the wheel cylinder to the master cylinder.

In the above constitution, the present invention may be formed as follows. That is, the braking force control apparatus executes a stability control using said high pressure source as said hydraulic source, in a state in which the communication between said wheel cylinder for a controlled-wheel and said master cylinder, to increase a wheel cylinder pressure for the controlled-wheel so that a yaw moment is generated to stabilize an action of the vehicle, the controlled-wheel being a wheel which should be controlled, and said termination control means comprises termination specifying control means for restoring the communication between said wheel cylinder for a not-controlled wheel in said stability control and said master cylinder after the wheel cylinder pressure for the not-controlled wheel is decreased so as to discontinue said brake assist control when a request for said stabilizing control occurs during execution of said brake assist control, said not-controlled wheel being a wheel which should not be controlled in said brake assist control.

In this constitution, while the stability control is being executed, the high pressure source is used as the hydraulic source to increase the wheel cylinder pressure for the controlled-wheel. AT this time, a not-controlled wheel communicates with the master cylinder in the same way as in the normal control. When the brake assist control is switched to the stability control (the stability control has a preference to the brake assist control), it is necessary to switch the hydraulic source for the not-controlled wheel from the high pressure source to the master cylinder. The termination specifying control means decreases the wheel cylinder pressure for the not-controlled wheel before switching the hydraulic source. Thus, when the brake assist control is switched to the stability control, a brake fluid having a high pressure does not flow back from the wheel cylinder for the not-controlled wheel to the master cylinder.

In addition, the termination control means may comprise pressure decreasing time calculation means for calculating a time for which said wheel cylinder pressure is increased, based on a deceleration of a vehicle body and master cylinder pressure at a time at which a termination request for said brake assist control occurs.

This constitution is effective in restraining variation of the master cylinder pressure before and after the brake assist control is terminated. That is, in the constitution in which the above-mentioned pressure decreasing time calculation means is provided, in order to terminate the brake assist control without a large amount of variation of the master cylinder pressure, it is appropriate that the communication between the wheel cylinder and the master cylinder is restored when the wheel cylinder pressure becomes a pressure similar to the master cylinder pressure. When the wheel cylinder pressure is greater than the master cylinder, a time required to decrease the wheel cylinder pressure to the master cylinder pressure by flowing out the brake fluid from the wheel cylinder depends on the wheel cylinder and master cylinder obtained at which the pressure starts decreasing. There is a relationship between a magnitude of the braking force applied to the vehicle and the wheel cylinder pressure generated in the wheel cylinder. Thus, the deceleration of the vehicle body may be used as a characteristic value of the wheel cylinder pressure. The above pressure decreasing time calculation means calculates a time for which said wheel cylinder pressure is decreased to a pressure similar to the master cylinder, based on a deceleration of a vehicle body and master cylinder pressure at a time at which a termination request for said brake assist control occurs.

Further, in the constitution in which the stability control is executed, the present invention may be formed as follows. That is, assist control means comprises assist control resuming means for resuming said brake assist control after said stability control is terminated in a case where said brake control was discontinued in response to a request for said stability control. The assist control resuming means is effective in consisting the function for stabilizing the turning action of the vehicle and the function for generating a large amount of braking force in an emergency case with each other. Specifically, when an execution request for the stability control occurs during the execution of the brake assist control, the brake assist control is discontinued. When the stability control is terminated, the brake assist control is rapidly resumed. In this case, with preference of the stabilization of the turning action of the vehicle, the function for the brake assist can be effectively used.

BRIEF DESCRIPTION OF THE DRAWINGS

FIG. 10 is a diagram illustrating relationships between the normal control in the first embodiment of the present invention, the brake assist control, an ABS control and a VSC control and states of respective solenoids; and FIG. 11 a diagram illustrating relationships between the normal control in the second embodiment of the present invention, the brake assist control and the ABS control and the VSC control and states of solenoids and the pump.

BEST CONFIGURATIONS FOR IMPLEMENTING THE INVENTION

Figure 1:
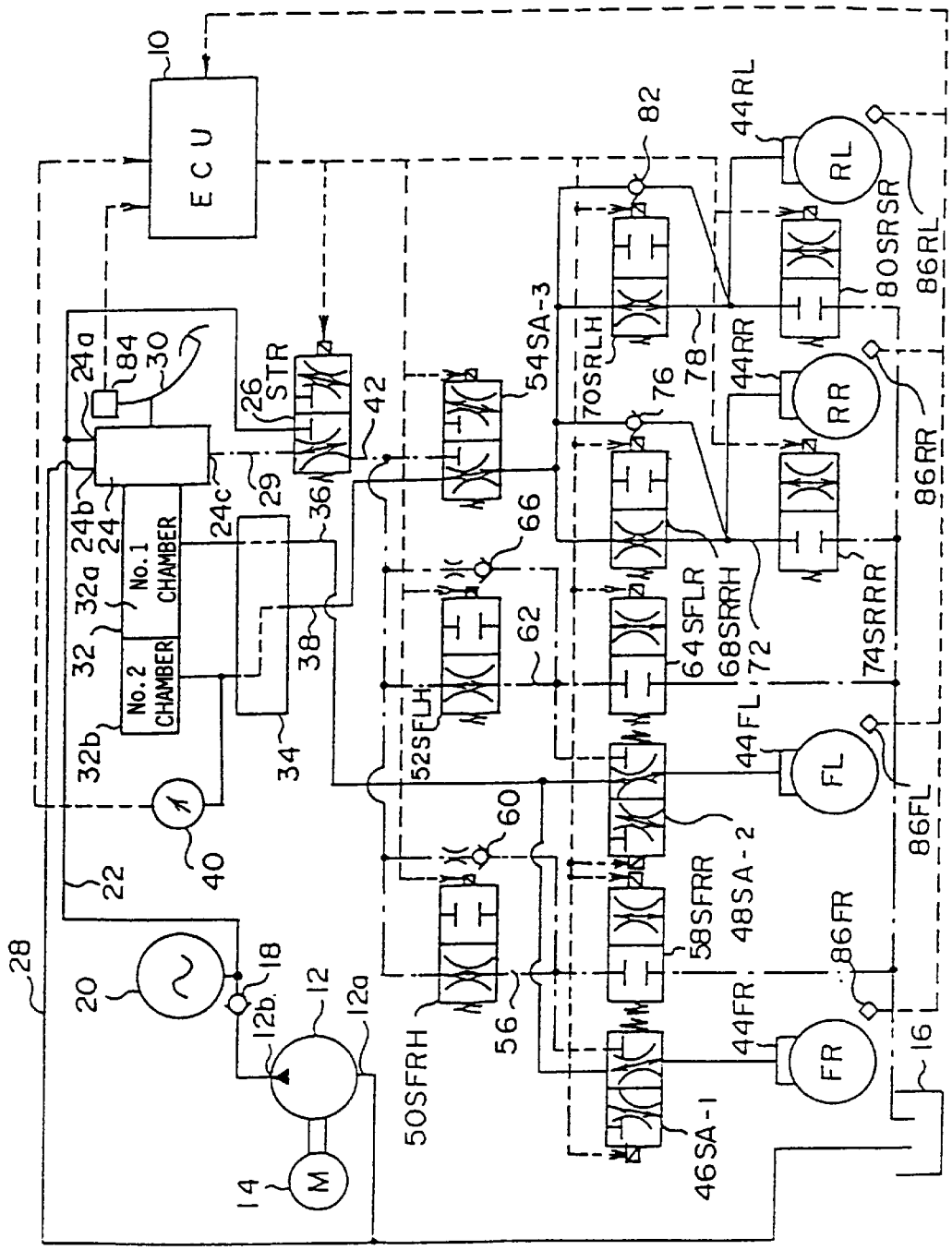
FIG. 1 is a drawing illustrating a system configuration of a first embodiment of the present invention.

FIG. 1 shows a system configuration of a braking force control apparatus according to a first embodiment of the present invention. A braking force control apparatus shown in FIG. 1 is controlled by an electronic control unit 10 (hereinafter, referred to as an ECU 10). The braking force control apparatus comprises a pump 12. The pump 12 has a motor 14 as a power source. An inlet port 12a of the pump 12 communicates with a reservoir tank 16. In addition, an outlet port 12b of the pump 12 communicates with an accumulator 20 via a check valve 18. The pump 12 delivers the brake fluid in the reservoir tank 16 from the outlet port 12b with a pressure so that a predetermined hydraulic pressure is accumulated in the accumulator 20.

The accumulator 20 communicates with a high-pressure port 24a of a regulator 24 and a regulator switching solenoid 26 (hereinafter, referred to as an STR 26) via a high-pressure passage 22. The regulator 24 has a low-pressure port 24a and a controlled hydraulic pressure port 24c. The low-pressure port communicates with the reservoir tank 16 via a low-pressure passage 28. The controlled hydraulic pressure port 24c communicates with the STR 26 via a controlled hydraulic pressure passage 29. The STR 26 is a two-positional solenoid valve which selectively sets one of the controlled hydraulic pressure passage 29 and a high-pressure passage 22 in a conductive state. In a normal sate, the STR 26 selects a portion so that the controlled hydraulic passage 29 is set in the conductive state and the high-pressure passage 22 is set in an closed state.

The regulator 24 is connected with a brake pedal 30. The master cylinder 32 is fixed to the regulator 24. The regulator 24 has a hydraulic chamber formed therein. The hydraulic chamber always communicates with the controlled hydraulic pressure port 24c, and selectively communicates with the high-pressure port 24a or the low-pressure port 24b in accordance with an operation state of the brake pedal 30. The regulator 24 is formed so that an internal pressure of the hydraulic chamber is controlled to a hydraulic pressure corresponding to the brake pedaling force FP. Thus, the controlled hydraulic pressure port 24c of the regulator 24 always outputs the hydraulic pressure corresponding to the brake pedaling force $F_p$. Hereinafter, this hydraulic pressure is referred to as a regulator pressure PRE.

The brake pedaling force $F_p$ applied to the brake pedal 30 is mechanically transmitted to the master cylinder 32 via the regulator 24. In addition, a force corresponding to the hydraulic pressure in the hydraulic chamber of the regulator 24, that is, a force corresponding to the regulator pressure PRE is transmitted to the master cylinder 32. Hereinafter, this force is referred to as a brake assist force FA. Thus, when the brake pedal 30 is pressed, a resultant of force of the brake pedaling force $F_p$ and the brake assist force FA is transmitted to the master cylinder 32.

The master cylinder 32 comprises a first hydraulic chamber 32a and a second hydraulic chamber 32b therein. In the first and second hydraulic chambers 32a and 32b, master cylinder pressures PM/C corresponding to the resultant of force of the brake pedaling force $F_p$ and the brake assist force FA are generated. Both the master cylinder pressure PM/C generated in the first hydraulic chamber 32a and the master cylinder pressure PM/C generated in the second hydraulic chamber 32b are communicated with a proportioning valve 34 (hereinafter, referred to as a P-valve 34).

The P-valve 34 communicates with the first hydraulic passage 36 and a second hydraulic passage 38. The P-valve 34 supplies the master cylinder pressure PM/C to the first hydraulic passage 36 and the second hydraulic passage 38 without change under a condition in which the master cylinder pressure PM/C is less than a predetermined value. In addition, the P-valve 34 supplies the master cylinder pressure PM/C to the first hydraulic passage 36 without change and supplies a hydraulic pressure, obtained by reducing the master cylinder pressure PM/C at a predetermined ratio, to the second hydraulic passage 38.

A hydraulic sensor 40 is provided between the second hydraulic chamber 32b of the master cylinder 32 and the P-valve 34. The hydraulic sensor 40 outputs an electric signal corresponding to the master cylinder pressure PM/C. The output signal from the hydraulic sensor 40 is supplied to the ECU 10. The ECU 10 detects the master cylinder pressure PM/C generated in the master cylinder 32 based on the output signal from the hydraulic sensor 40.

The STR described above communicates with a third hydraulic passage 42. The third hydraulic passage 42 is set, in accordance with the state of the STR 26, in the conductive state with respect to either the controlled hydraulic pressure passage 29 or the high-pressure passage 22. In the present embodiment, to wheel cylinders 44FL and 44FR respectively mounted for front left and right wheels FL and FR, the brake hydraulic pressure is supplied from the first hydraulic passage 36 communicating with the P-valve 34 or from the third hydraulic passage 42 communicating with the STR 26. In addition, to wheel cylinders 44RL and 44RR respectively mounted for rear left and right wheels RL and RR, the brake hydraulic pressure is supplied from the second hydraulic passage 38 communicating with the P-valve 34 or from the third hydraulic passage 42 communicating with the STR 26.

The first hydraulic passage 36 communicates with a first assist solenoid 46 (hereinafter, referred to as an $SA_{-1}$ 46) and a second assist solenoid 48 (hereinafter, referred to as an $SA_{-2}$ 48). The third hydraulic passage 42 communicates with a right front wheel holding solenoid 50 (hereinafter, referred to as an SFRH 50), a left front wheel holding solenoid 52 (hereinafter, referred to as an SFLH 52) and a third assist solenoid 54 (hereinafter, referred to as an $SA_{-3}$ 54).

The SFRH 50 is a two-positional solenoid valve which is maintained in an open valve state in a normal state. The SFRH 50 communicates with the $SA_{-1}$ 46 and a right front wheel pressure decreasing solenoid valve 58 (hereinafter, referred to as an SFRR 58) via a pressure adjusting hydraulic passage 56. A check valve 60 permitting a fluid flow only in a direction from the pressure adjusting hydraulic passage 56 to the third hydraulic passage 42 is provided, in parallel, between the third hydraulic passage 42 and the pressure adjusting hydraulic passage 56.

The $SA_{-1}$ 46 is a two-positional solenoid valve which causes one of the first hydraulic passage 36 and the pressure adjusting hydraulic passage 56 to selectively communicate with the wheel cylinder FR. In the normal state (an off-state), the $SA_{-1}$ 46 causes the first hydraulic passage 36 to communicate with the wheel cylinder FR. On the other hand, the SFRR 58 is a two-positional solenoid valve which sets the pressure adjusting hydraulic passage 56 and the reservoir tank 16 in the conductive state or in the closed state. The SFRR 58 sets the pressure adjusting hydraulic passage 56 and the reservoir tank 16 in the closed state in the normal state (the off-state).

The SFLH 52 is a two-positional solenoid valve which is maintained in an open valve state in the normal state. The SFLH 52 communicates with the $SA_{-2}$ 48 and a left front wheel pressure decreasing solenoid 64 (hereinafter, referred to as SFLR 64) via an adjusting pressure hydraulic passage 62. A check valve 66 permitting a fluid flow only in a direction from the pressure adjusting hydraulic passage 62 to the third hydraulic passage 42 is provided, in parallel, between the third hydraulic passage 42 and the pressure adjusting hydraulic passage 62.

The $SA_{-2}$ 48 is a two-positional solenoid valve which causes one of the first hydraulic passage 36 and the pressure adjusting hydraulic passage 62 to selectively communicate with the wheel cylinder FL. In the normal state (the off-state), the $SA_{-2}$ 48 causes the first hydraulic passage 36 to communicate with the wheel cylinder FL. On the other hand, SFLR 64 is a two-positional solenoid valve which sets the pressure adjusting hydraulic passage 62 and the reservoir tank 16 in the conductive state or the closed state. The SFLR 64 sets the pressure adjusting hydraulic passage 62 and the reservoir tank 16 in the closed state in the normal state (the off-state).

The second hydraulic passage 38 communicate with the $SA_{-3}$ 54 described above. The downstream side of the $SA_{-3}$ 54 communicates with a right rear wheel holding solenoid 68 (hereinafter, referred to as an SRRH 68) and a left rear wheel holding solenoid 70 (hereinafter, referred to as an SRLH 70). The SRRH 68 is provided so as to correspond to the wheel cylinder 44RR for the right rear wheel RR. The SRLH 70 is provided so as to correspond to the wheel cylinder 44RL for the left rear wheel RL. The $SA_{-3}$ 54 is a two-positional solenoid valve which causes one of the second hydraulic passage 38 and the third hydraulic passage 42 to selectively communicate with the SRRH 68 and the SRLH 70. In the normal state (the off-state), the SA-$_3$ 54 causes the second hydraulic passage 38 to communicate with the SRRH 68 and the SLRH 70.

The downstream side of the SRRH 68 communicates with the wheel cylinder 44RR and a right rear wheel pressure decreasing solenoid 74 (hereinafter, referred to as SRRR 74) via the pressure adjusting hydraulic passage 72. The SRRR 74 is a two-positional solenoid valve which sets the pressure adjusting hydraulic passage 72 and the reservoir tank 16 in the conductive state or the closed state. In the normal state (the off-state), the SRRR 74 sets the pressure adjusting hydraulic passage 72 and the reservoir tank 16 in the closed state. In addition, a check valve 72 permitting a fluid flow only in a direction from the pressure adjusting hydraulic passage 72 to the SA-$_3$ 54 is provided, in parallel, between the SA-$_3$ 54 and the pressure adjusting hydraulic passage 72.

Similarly, the downstream side of the SRLH 70 communicates with the wheel cylinder 44RL and a left rear wheel pressure decreasing solenoid 80 (hereinafter, referred to as an SRLR 80) via a pressure adjusting hydraulic passage 78. The SRLR 80 is a two-positional solenoid valve which sets the pressure adjusting hydraulic passage 78 and the reservoir tank 16 in the conductive state or the closed state. In the normal sate (the off-state), the SRLR 80 sets the pressure adjusting hydraulic passage 78 and the reservoir tank 16 in the closed state. In addition, a check valve 82 permitting a fluid flow only in a direction from the pressure adjusting hydraulic passage 78 to the SA-$_3$ 54 is provided, in parallel, between the SA-$_3$ 54 and the pressure adjusting hydraulic passage 78.

In the system according to the present embodiment, a brake switch 84 is provided near the brake pedal 30. The brake switch 84 is a switch which is in an on-state while the brake pedal 30 is being pressed. The output signal from the brake switch 84 is supplied to the ECU 10. The ECU determines, based on the output signal from the brake switch 84, whether a driver carries out a braking operation.

In addition, in the system according to the present invention, wheel speed sensors 86FL, 86FR, 86RL and 86RR (hereinafter, numbered as 86 as a whole) are respectively provided near the left and right front wheels FL and FR and the left and right rear wheels RL and RR, each of the sensors generating a pulse every time corresponding wheel rotates by a predetermined angle. The output signals from the wheel speed sensors 86 are supplied to the ECU 10. The ECU 10 detects revolution speeds of the respective wheels FL, FR, RL and RR, that is, wheel speeds of the respective wheels FL, FR, RL and RR based on the output signals from the wheel speed sensors 86**. Further, the ECU 10 is connected with a steering angle sensor 88 which outputs a pulse signal based on a rotational angle and direction of a steering wheel. The ECU 10 detects a steering wheel angle θ based on the output signal from the steering angle sensor 88.

The ECU 10 supplies, if necessary, driving signals to the above-mentioned STR 26, SA-$_1$ 46, SA-$_2$ 48, SA-$_3$ 54, SFRH 50, SFLH 52, SFRR 58, SFLR 64, SRRH 68, SRLH 70, SRRR 74 and SFLR 80 based on the output signals from a hydraulic sensor 40, the wheel speed sensors 86**, the steering angle sensor 88 and the brake switch 84.

A description will now be given of an operation of the braking force control apparatus according to the present embodiment. When the vehicle is in a stable state, the braking force control apparatus according to the present embodiment carries out the normal control for generating a braking force corresponding to the brake pedaling force F$_p$ applied to the brake pedal 30. The normal control is implemented, as shown in FIG. 1, by setting the STR 26, SA-$_1$ 46, SA-$_2$ 48, SA-$_3$ 54, SFRH 50, SFLH 52, SFRR 58, SFLR 64, SRRH 68, SRLH 70 SRRR 74 and SRLR 80 in the off-state.

That is, in the state shown in FIG. 1, the wheel cylinders 44FR and 44FL are caused to communicate with the first hydraulic passage 36, and the wheel cylinders 44RR and 44RL are caused to communicate with the second hydraulic passage 38. In this case, the brake fluid flows between the master cylinder 32 and the wheel cylinders 44FR, 44FL, 44RL and 44RR (hereinafter, numbered as 44** as a whole), so that a braking force corresponding to the brake pedaling force FP is applied to each of the wheels FL, FR, RL and RR.

In the present embodiment, when a possibility that one of the wheels is going to be in a lock state is detected, it is determined that a condition in which an antilock brake control (hereinafter, referred to as an ABS control) should be performed is established. The ABS control then starts. The ECU 10 calculates the wheel speeds Vw$_{FL}$, Vw$_{FR}$, Vw$_{RL}$ and Vw$_{RR}$ (hereinafter, symbolized as Vw as a whole) of the respective wheels based on the wheel speed sensors 86. The ECU 10 further calculates an assumed value VSO of a vehicle speed (hereinafter, referred to as an assumed vehicle speed VSO) based on the wheel speeds Vw** in accordance with a known method. When the vehicle is in a braking state, a slip ratio S each of the wheels is calculated in accordance with the following equation. When S is greater than a predetermined value, it is determined that there is a possibility that the wheel is going to be in a lock state.

$$S=(V_{SO}-V_{W}W^{**})\cdot 100/V_{SO} \qquad (1)$$

When the condition in which the ABS control should be performed is established, the ECU 10 output the driving signals to the AS-$_1$ 46, the AS-$_2$ 48 and AS-$_3$ 54. As a result, when the AS-$_1$ 46 is turned on, the wheel cylinder 44FL is disconnected from the first hydraulic passage 36 and connected to the pressure adjusting hydraulic passage 62. Further, when the SA-$_3$ 54 is turned on, the upstream sides of the SRRH 68 and the SRLH 70 are disconnected from the second hydraulic passage 38 and connected to the third hydraulic passage 42.

In this case, all the wheel cylinders 44 respectively communicate with the holding solenoids SFRH 50, SFLH 52, SRRH 68 and SRLH 70 (hereinafter, referred to as holding solenoids SH as a whole) and the pressure decreasing solenoids SFRR 58, SFLR 64, SRRR 74 and SRLR 80 (hereinafter, referred to as pressure decreasing solenoids SR as a whole). A regulator pressure P$_{RE}$ is introduced to al the upstream sides of all the holding solenoids SH via the third hydraulic passage 42 and the STR 26.

Under the above condition, the holding solenoids SH are in an open valve state and the pressure decreasing solenoids SR are in a closed valve state, so that the wheel cylinder pressures PW/C of the wheel cylinders 44** are increased to the regulator pressure P$_{RE}$ as an upper limit. Hereinafter, this state is referred to as a regulator pressure increasing mode ①.

In addition, when the holding solenoids SH are in the closed valve state and the pressure decreasing solenoids SR are in the closed valve state, the wheel cylinder pressures Pw/c of the wheel cylinders 44** are not increased and maintained. This state is referred to as a holding mode ②.

Further, when the holding solenoids SH are in the closed valve state and the pressure decreasing solenoids SR are in the open valve state, the wheel cylinder pressures Pw/c of the wheel cylinders 44** are decreased. This state is referred to as a pressure decreasing mode ③.

The ECU 10 carries out processes in the above-mentioned regulator pressure increasing mode ①, the holding mode ② and the pressure decreasing mode ③ so that the slip ratio of each of the wheels is controlled within an appropriate value range, that is, so that each of the wheels is not shifted to a lock state.

When a depression of the brake pedal 30 is released by the driver during execution of the ABS control, the wheel cylinder pressure Pw/c must be immediately decreased. In the system according to the present embodiment, the check valves 60, 66, 76 and 82 permitting a fluid flow in a direction from the wheel cylinders 44 to the third hydraulic passage 42 are provided in hydraulic passages for the wheel cylinders 44. Thus, according to the system of the present embodiment, when the depression of the brake pedal 30 is released, the wheel cylinder pressures Pw/c of the wheel cylinders 44** can be immediately decreased.

In the system according to the present embodiment, when the ABS control is performed, the wheel cylinder pressure Pw/c is increased by the brake fluid being supplied from the regulator 24 to the wheel cylinders 44, that is, by the brake fluid being supplied from the pump 12 to the wheel cylinders 44, and is decreased by the brake fluid in the wheel cylinders 44** flowing to the reservoir tank 16. When the increase in the wheel cylinder pressure Pw/c is performed by using the master cylinder 32 as a fluid pressure source and if the pressure increasing mode and the pressure decreasing mode are repeatedly performed, the brake fluid in the master cylinder 32 gradually decreases and a so-called bottoming of the master cylinder may occur.

On the other hand, if the pump 12 is used as a fluid pressure source so as to increase the wheel cylinder pressure Pw/c, as in the system according to the present embodiment, such a bottoming can be prevented. Thus, in the system according to the present embodiment, a stable operational state can be maintained if the ABS control is continued for a long time.

In the system according to the present embodiment, the ABS control is started when a possibility for shifting to the locked state is detected in one of the wheels. Accordingly, in order to start the ABS control, as a precondition, a braking operation having a level at which a large slip rate S is generated in one of the wheels must be performed.

Figure 2:
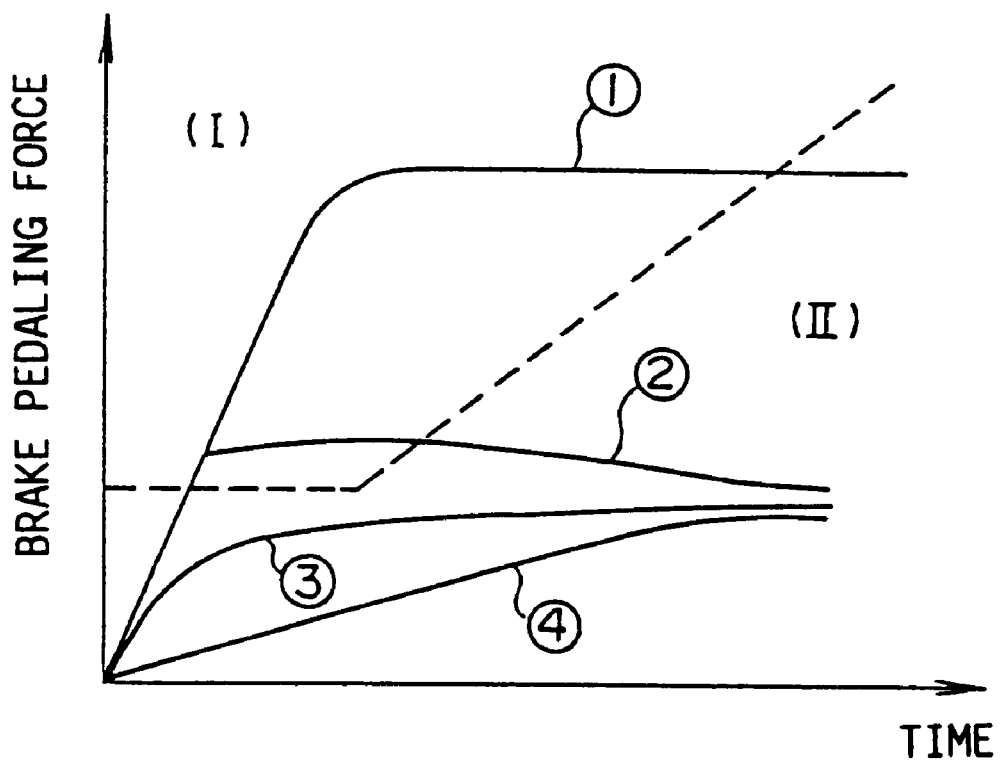
FIG. 2 is a diagram illustrating variation sates of the brake pedaling force in various conditions.

FIG. 2 shows changes in the brake pressing force FP applied to the brake pedal 30 with respect to time under various conditions. Curves indicated by ① and ② in FIG. 2 represent changes in the pressing force FP when an emergency braking is performed by a highly skilled driver (hereinafter, referred to as a high-grade driver) and an unskilled driver or a driver lacking (hereinafter, referred to as a beginner-grade driver), respectively. The emergency braking operation is an operation performed when is it desired to rapidly decelerate a vehicle. Accordingly, the brake pressing force associated with the emergency braking operation is preferably a force sufficiently large as the ABS control is performed.

As shown by the curve ①, when the driver of the vehicle is a high-grade driver, the brake pressing force FP is immediately and rapidly increased in response to establishment of a condition in which an emergency braking is required, and a large brake pressing force FP can be maintained for a long time. If such a brake pressing force FP is exerted on the brake pedal 30, a sufficiently high brake fluid pressure can be provided from the master cylinder 32 to each of the wheel cylinders 44** so as to start the ABS control.

However, as shown by the curve ② when the driver of the vehicle is a beginner-grade driver, the brake pressing force FP may not be increased to a sufficiently high value in response to the condition in which an emergency braking is required. If the brake pressing force FP exerted on the brake pedal 30 is not sufficiently increased as shown by the curve ② after an emergency braking is required, the wheel cylinder pressure Pw/c in each of the wheels 44** is not sufficiently increased, which results in a possibility that the ABS control is not started.

As mentioned above, when the driver of the vehicle is a beginner-grade driver, the braking ability of the vehicle may not be sufficiently performed even when an emergency braking operation is performed despite that the vehicle has a good braking ability. Accordingly, the system according to the present embodiment is provided with a brake assist function for sufficiently increasing the wheel cylinder pressure Pw/c even if the brake pressing force FP is not sufficiently increased when the brake pedal is operated with an intention to perform an emergency braking. Hereinafter, a control performed by the ECU 10 to achieve such a function is referred to as a brake assist control.

In the system according to the present embodiment, when performing the brake assist control, an accurate determination must be made as to whether, when the brake pedal 30 is operated, the operation is intended to perform an emergency braking operation or to perform a regular braking operation.

Curves indicated by shown ③ and ④ in FIG. 2 show changes in the brake pressing force FP when the driver operates the brake pedal with an intention to perform a normal braking operation under various conditions. As shown by the curves ① to ④, a change in the brake pressing force FP associated with the normal braking operation is gentle as compared to a change in the brake pressing force FP associated with an emergency braking operation. Additionally, a convergent value of the brake pressing force FP associated with the normal braking operation is not so large as a convergent value of the brake pressing force FP associated with an emergency braking operation.

Giving attention to those differences, when the brake pressing force FP is increased to a sufficiently large value at a rate of change exceeding a predetermined value after a braking operation is started, that is, when the brake pedal 30 is operated so that the brake pressing force FP reaches an area indicated by (I) in FIG. 2, it can be determined that an emergency braking is performed.

Additionally, when the rate of change of the brake pressing force FP is smaller than the predetermined value or when the convergent value of the brake pressing force FP is smaller than the predetermined value, that is, when the brake pedal 30 is operated so that the brake pressing force FP always changes within an area indicated by (II) in FIG. 2, it can be determined that a normal braking operation is performed.

Accordingly, in the system according to the present embodiment, an operational speed and an amount of operation of the brake pedal are detected or assumed, and, then, it is determined whether or not the operational speed exceeds a predetermined value and whether or not the amount of operation exceeds a predetermined value, and, thereby, it can be determined whether or not the operation on the brake pedal 30 is intended to perform an emergency braking.

In the present embodiment, the speed and magnitude of the operation of the brake pedal 30 are detected as a parameter that is the master cylinder pressure $P_{m/c}$ detected by the hydraulic pressure sensor 40 (hereinafter the parameter used for this application is referred to as a basic parameter). The master cylinder pressure $P_{M/C}$ indicates a value based on the magnitude of the operation of the brake pedal 30, and varies with a variation ratio $P_{M/C}$ based on the operation speed of the brake pedal 30. Hence, according to the apparatus of the present embodiment, when the braking operation is performed by the driver, it is possible to precisely determine whether the operation is an emergency operation or normal braking operation.

A description will be given of an operation of the system according to the embodiment in a case where it is determined, by the ECU 10, that an emergency braking operation is performed. The ECU 10 determines that an emergency braking operation is performed when the master cylinder pressure $P_{m/c}$ that has a value greater than a predetermined value is detected and the variation ratio $\Delta P_{M/C}$ that has a value greater than a predetermined value is detected after the brake pedal 30 is pressed. When it is determined that the emergency braking operation is performed, the ECU 10 sends a drive signal to the STR 26, $SA_{-1}$ 46, $SA_{-2}$ 48 and $SA_{-3}$ 54.

When the STR 26 is turned on in response to the above drive signal, the third hydraulic passage 42 and the high-pressure 22 are joined together. In this case, an accumulator pressure $P_{acc}$ is introduced into the third hydraulic passage 42. When the $SA_{-1}$ 46 and $SA_{-2}$ 48 are turned on in response to the drive signal, the wheel cylinders 44FR and 44FL are jointed to the pressure-adjusting hydraulic passages 56 and 62, respectively. Further, when the $SA_{-3}$ 54 is turned on in response to the dive signal, the upstream portions of the SRRH 68 and SRLH 70 are jointed to the third hydraulic passage 42. In this case, a state is formed in which all the wheel cylinders 44 are jointed to the respective holding solenoids SH and the pressure decreasing solenoids SR, and the accumulator pressure $P_{acc}$ is introduced into the upstream portions of all the holding solenoids SH.

In the ECU 10, immediately after the execution of the emergency braking operation is detected, all the holding solenoids SH and all the pressure decreasing solenoids SR are maintained in the off state. Hence, as described above, when the accumulator pressure $P_{acc}$ is introduced into the upstream portions of the holding solenoids SH, the fluid pressure is supplied to the wheel cylinders 44 as it is. As a result, the wheel cylinder pressures $P_{w/c}$ of all the wheel cylinders 44** are increased toward the accumulator pressure $P_{ACC}$.

As described above, according to the system of the present embodiment, when the emergency braking operation is performed, the wheel cylinder pressures $P_{w/c}$ of all the wheel cylinders 44** can rapidly be increased irrespective of the magnitude of the brake pedaling force $F_P$. Thus, according to the system of the present invention, even if the driver is a beginner-grade driver, a large braking force can rapidly be produced after a situation necessary for an emergency braking occurs.

When the accumulator pressure $P_{ACC}$ is started to be applied to the wheel cylinders 44**, the slip ratios S of the wheels FL, FR, RL and RR are abruptly increased, and then the condition for execution of the ABS control stands. When the condition for execution of the ABS control is satisfied, the ECU 10 carries out the processes in the pressure increasing mode ①, the holding mode ② and the pressure decreasing mode ③ so that the slip ratios of all the wheels fall within an appropriate range, that is, all the wheels are prevented from being locked.

In a case where the ABS control is executed after the above-mentioned emergency braking operation, the wheel cylinder pressures $P_{w/c}$ are increased by supplying the brake fluid to the wheel cylinders 44 from the pump 12 and the accumulator 20, and decreased by flowing back the brake fluid from wheel cylinders 44 to the reservoir tank 16. Thus, even if the pressure increasing mode and pressure decreasing mode are alternately performed, so-called bottoming of the master cylinder 31 may not occur.

When the emergency braking operation is performed and thus the brake assist control is started, it is required to terminate the brake assist control when the brake pedal 30 is released from the pressed state. In the system of the present embodiment, while the brake assist control is being performed, the STR 26, $SA_{-1}$ 46, $SA_{-2}$ 48 and $SA_{-3}$ 54 are maintained in the on states as have been described. In the case where the STR 26, $SA_{-1}$ 46, $SA_{-2}$ 48 and $SA_{-3}$ 54 are maintained in the on state, the hydraulic chamber within the regulator 24 and the first and second hydraulic chambers 32a and 32b of the master cylinder 32 are substantially closed spaces.

Under the above situation, the master cylinder pressure $P_{M/C}$ has a value dependent on the brake pressing force $F_P$. Hence, the EUC 10 monitors the output signal of the master cylinder pressure $P_{M/C}$ sensed by the hydraulic sensor 40, and can easily determine whether the brake pedal 30 is released from the pressed state. When it is sensed that the brake pedal 30 is released from the pressed state, the ECU 10 stops supplying the STR 26, $SA_{-1}$ 46 and $SA_{-2}$ 48 with the drive signals to terminate the brake assist control.

Meantime, the brake assist control is a control for generating the wheel cylinder pressure $P_{w/c}$ with a high pressure value when the master cylinder pressure $P_{M/C}$ is not sufficiently increased. Thus, while the brake assist control is being executed, the wheel pressure $P_{w/c}$ greater than the master cylinder pressure $P_{M/C}$ is generated in each of the wheel cylinders 44. If immediately after the termination request of the brake assist control occurs, the $SA_{-1}$ 46, $SA_{-2}$ 48 and $SA_{-3}$ 54 are turned off so that the wheel cylinders 44 are joined to the master cylinder 32, a large amount of brake fluid having a high pressure flows back from the wheel cylinders 44** to the master cylinder 32. Thus, in the braking force control apparatus according to the present invention, when the termination request of the brake assist control occurs, a termination control is executed. In the termination control, first, the STR 26 is turned of before the $SA_{-1}$ 46, $SA_{-2}$ 48 and $SA_{-3}$ 54 are turned off. After a predetermined time has elapsed from the turning-off operation of the STR 26, the $SA_{-1}$ 46, $SA_{-2}$ 48 and $SA_{-3}$ 54 are turned off.

When the above-mentioned termination control is executed, the high fluid pressure stored in the wheel cylinders 44 while the brake assist control is being executed is supplied to the controlled hydraulic port 24c of the regulator 24, not to the master cylinder 32. The regulator 24 causes the controlled hydraulic port 24c to selectively communicate with the high-pressure port 24a or the low-pressure port 24b so that the regulator pressure $P_{RE}$ is controlled to a value corresponding to the brake pedaling force $F_p$. As a result, the high fluid pressure from each of the wheel cylinders 44 passes through the regulator 24 and is freed in the reservoir tank 16. Each of the wheel cylinders 44** is then joined to the master cylinder 32 after the difference between the master cylinder pressure $P_{M/C}$ and the wheel cylinder pressure $P_{w/c}$ is decreased. Thus, according to the braking force control apparatus of the present embodiment, when the brake assist control is terminated, an unreasonably high fluid pressure is prevented from being supplied to the master cylinder 32.

The ECU 10 executes a vehicle stability control (hereinafter, referred to as a VSC control) when a running action of the vehicle turning around is unstable. The VSC control is a control for generating a braking force for a predetermined wheel of the vehicle turning around so that a yaw moment is generated to stabilize the running action of the vehicle. A description will now be given, with reference to FIGS. 3 and 4, of the VSC control.

Figure 3:
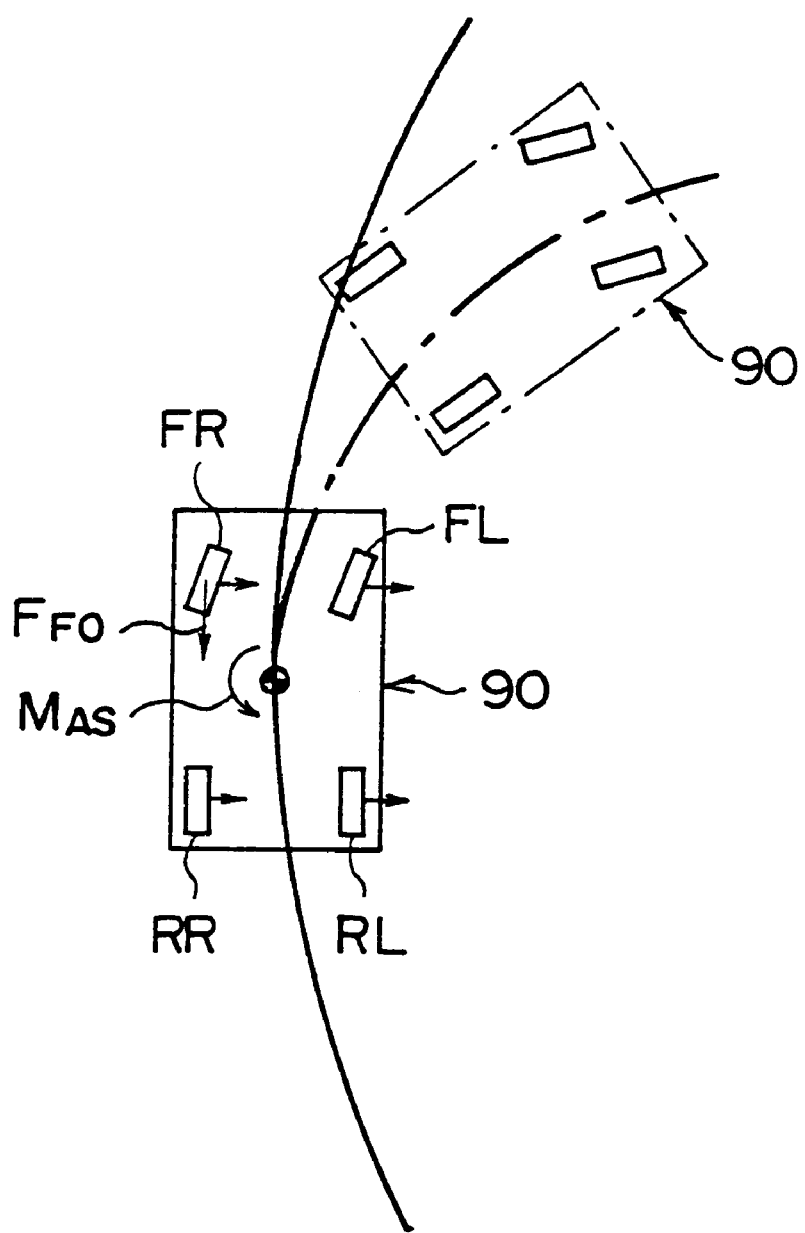
FIG. 3 is a diagram illustrating a process for transferring a vehicle to a spin-out state.

FIG. 3 illustrates a process in which a vehicle 90 is brought to a spin state. In FIG. 3, an arc indicated by a solid line is an ideal running line of the vehicle 90 which is intended by a driver. In addition, an arc indicated by a chain line is a running line of the vehicle 90 which is in the spin state. When a cornering force CF depending on the vehicle speed V and a turning radius R is not generated in each of the rear wheels RL and RR, the vehicle 90 turning around is brought into the spin state.

When the vehicle 90 is started to be brought to the spin state, a braking force FFO is generated for an outer wheel out of the left and right front wheels turning around as shown in FIG. 3. At this time, a moment (hereinafter, referred to as an anti-spin moment MAS) restraining the vehicle from turning around can be applied to the vehicle 90 and the vehicle speed V can be reduced. After the vehicle is started to be brought to the spin state, when the vehicle speed V is decreased to an appropriate value, the cornering force CF of each of the rear wheels RL and RR is controlled to a value depending on the vehicle speed V and the turning radius R, and the spin state is converged. As has been described above, an appropriate braking force FFO is generated for the outer wheel out of the left and right front wheels FL and FR turning around, so that the spin sate of the vehicle 90 can be converged.

Figure 4:
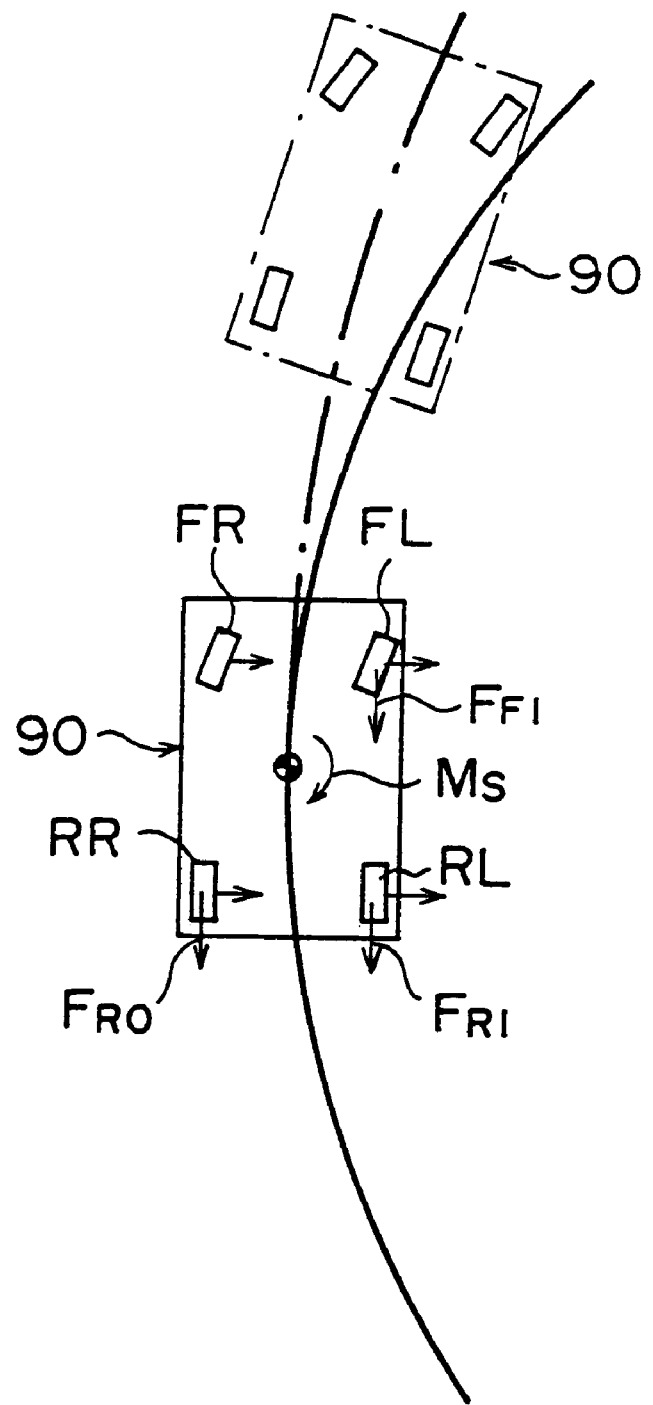
FIG. 4 is a diagram illustrating a process for transferring a vehicle to a drift-out state.

FIG. 4 shows a process in which the vehicle 90 is brought to a drift-out state. In FIG. 4, an arc indicated by a solid line is an ideal running line of the vehicle 90 which is intended by a driver. In addition, an arc indicated by a chain line is a running line of the vehicle 90 which is in the drift-out state. When the cornering force CF depending on the vehicle speed V and a turning radius R is not generated in each of the front wheels FL and FR, the vehicle 90 turning around is brought into the drift-out state.

When the vehicle 90 is started to be brought to the drift-out state, a braking force FFI is generated for an inner wheel out of the left and right front wheels FL and FR turning around as shown in FIG. 4. At this time, a moment (hereinafter, referred to as an spin moment Ms) encouraging the turn of the vehicle 90 can be applied to the vehicle 90 and the vehicle speed V can be reduced. In addition, when braking forces FFO and FFI are respectively generated for the left and right rear wheels RL and RR, a load can be shifted toward the front wheels FL and FR with decreasing the vehicle speed V. The grip force of each of the front wheels FL and FR can be increased. As a result, when the vehicle speed V is decreased to an appropriate level, the cornering force CF of each of the front wheels FL and FR reaches a value depending on the vehicle V and the turning radius R, and the drift-out sate is converged. As has been described above, appropriate braking forces Fi, FRO and FRI are generated for the inner wheel out of the left and right front wheels FL and FR and the left and right rear wheels, so that the drift-out state of the vehicle 90 can be converged.

While the vehicle provided with the braking force control apparatus according to the present embodiment is turning around, the ECU 10 obtains an actual yaw rate $\gamma$ by calculation using a known vehicle model or using a yaw rate sensor and an ideal yaw rate $\gamma^*$ corresponding to the vehicle speed V and a steering angle $\theta$. The ECU 10 compares $\gamma$ and $\gamma^*$ with each other and determines whether the vehicle is in the spin state or the drift-out state.

When it is determined, based on the above comparison result, that the vehicle is in the spin state, the VSC control for restraining the spin state of the vehicle is started. In this VSC control, an outer wheel out of the left and right front wheels FL and FR turning around is set as a controlled-wheel which should be controlled, and other three wheels are set as not-controlled-wheels which should not be controlled.

Specifically, the above-mentioned VSC restraining control (i) turns on the STR 26, (ii) brings the assist solenoid (SA-$_1$ 46 or SA-$_2$ 48) corresponding to the controlled-wheel into the on-state, and (iii) carries out an open/close control of the holding solenoid (SFRH 50 or SFLH 52) and the pressure decreasing solenoid (SFRR 58 or SFLR 64) corresponding to the controlled-wheel.

Under the above-mentioned condition, the wheel cylinders 44 for the not-controlled wheels are maintained to be joined to the master cylinder 32. On the other hand, the wheel cylinder 44FR or FL for the controlled-wheel ① communicates with the accumulator 20 when the holding solenoid (SFRH 50 or SFLH 52) is in the open valve sate and the pressure decreasing solenoid (SFRR 58 or SFLR 64) is in the closed valve state (hereinafter, this state is referred to as an accumulator pressure increasing mode), ② is disconnected from the hydraulic passage when both the holding solenoid (SFRH 50 or SFLH 52) and the pressure decreasing solenoid (SFRR 58 or SFLR 64) are in the closed valve state (hereinafter, this state is referred to as a holding mode), and ③ communicates with the reservoir tank 16 when the holding solenoid (SFRH 50 or SFLH 52) is in the closed valve state and the pressure decreasing solenoid (SFRR 58 or SFLR 64**) is in the open valve state (hereinafter, this state is referred to as a pressure decreasing mode).

The ECU 10 carries out processes for the controlled-wheel in the accumulator pressure increasing mode ①, the holding mode ② and the pressure decreasing mode ③ so that the actual yaw rate is equal to the ideal yaw rate. As a result, after the VSC control for restraining the spin state of the vehicle is started, the turning action of the vehicle is corrected so that the vehicle is capable of tracing the ideal running line.

In addition, when the ECU 10 which compares the actual yaw rate $\gamma$ and the ideal yaw rate $\gamma^*$ determines that the vehicle is in the drift-out state, the VSC control for restraining the drift-out state of the vehicle is started. In the VSC control, an inner wheel out of the left and right front wheels FL and FR turning around and the left and right rear wheels RL and RR are set as controlled-wheels which should be controlled and an outer wheel out of the front wheels turning around is set as a non-controlled wheel which should not be controlled.

Specifically, the VAC control (i) turns on the STR 26, (ii) brings the assist solenoids (AS-$_1$ 46 or AS-$_2$ 48 and SA-$_3$ 54) corresponding to the controlled wheels into the on state, and (iii) carries out the open/close control of the holding solenoids (SFRH 50 or SFLH52 and SRRH 68 and SRLH 79) and the pressure decreasing solenoids (SFRR 58 or SFLR 64 and SRRR 74 and SRLR 80) corresponding to the controlled-wheels.

Under the above-mentioned condition, the wheel cylinder FR or FL corresponding to the not-controlled wheel is maintained to communicate with the master cylinder 32. On the other hand, the wheel cylinders 44FR or 44FL and 44RR and 44RL for the controlled-wheels ① are controlled in the accumulator pressure increasing mode when corresponding holding solenoids are in the open valve state and corresponding pressure decreasing solenoids are in the closed valve state, ② are controlled in the holding mode when corresponding holding solenoids and pressure decreasing solenoids are in the closed valve state, and ③ are controlled in the pressure decreasing mode when corresponding holding solenoids are in the closed valve state and corresponding pressure decreasing solenoids are in the open valve state.

The ECU 10 carries out the processes for the controlled-wheels in the accumulator pressure increasing mode, the holding mode and the pressure decreasing mode so that the actual yaw rate γ is equal to the ideal yaw rate γ*. As a result, after the VSC control for restraining the drift-out state is started, the turning action of the vehicle is corrected so that the vehicle is capable of tracing the ideal running line.

As has been described above, the wheel cylinder 44** for the not-controlled wheel is joined to the master cylinder 32 while the VSC control is being carried out. Thus, the wheel cylinder pressure Pw/c for the non-controlled wheel can be increased and decreased by the breaking operation of the driver even if the VSC control is carried out. When the wheel cylinder pressure Pw/c for the not-controlled wheel is increased or decreased, the ECU 10 realizes a breaking force distribution which is suitable for stabilizing the action of the vehicle, with consideration of the influence of the increasing or decreasing of the wheel cylinder pressure Pw/c. Thus, according to the braking force control apparatus of the present embodiment, when the turning action of the vehicle is unstable, the turning action of the vehicle can be stabilized with maintaining a function for increasing and decreasing the breaking force in accordance with the driver's intention.

As has been described above, the braking force control apparatus according to the present embodiment suitably executes the normal control, the brake assist control, the ABS control and the VSC control in accordance with the running state of the vehicle and the operation state of the driver. The states of the respective solenoids used in the above controls are indicated in FIG. 10 as a reference. In FIG. 10, the off state of the STR 26 means a state in which the third hydraulic passage 42 communicates with the regulator 24. The off states of the SA-$_1$–SA-$_3$ means a state in which the wheel cylinders 44** communicate with the master cylinder 32.

Meantime, while the vehicle is running, there may be a case where after the brake assist control is started in response to the emergency braking operation, the turning state of the vehicle becomes unstable and the VSC control is needed. In such a case, the stabilization of the turning action of the vehicle should be preferred. It is necessary to terminate the brake assist control and to start the VSC control.

As shown in FIG. 10, all the AS-$_1$–SA-$_3$ are in the on state while the brake assist control is being executed. On the other hand, in the VSC control, although the assist solenoid provided for the controlled-wheel is in the on state, the assist solenoid provided for the not-controlled wheel is in the off state. Thus, in order to discontinue the brake assist control and to start the VSC control, it is necessary to switch the assist solenoid provided for the not-controlled wheel from the on state to the off state.

However, the wheel cylinder pressures Pw/c of all the wheel cylinder 44** are greater than the master cylinder pressure PM/C. Thus, if the assist solenoid provided for the not-controlled wheel of the VSC control is switched from the on state to the off state immediately after the request for the VSC control occurs, the brake fluid having a high pressure flows back to the master cylinder 32 via the assist solenoid which has been switched to the off state.

In this case, if the termination control for switching the STR 26 to the off state is carried out before switching the assist solenoid, the unreasonable back current of the brake fluid from the wheel cylinder to the master cylinder can be avoided. However, as shown in FIG. 10, it is necessary to maintain the STR 26 in the on state while the VSC control is being executed, similarly to the case of executing the ABS control. Thus, when the brake assist control is discontinued and the VSC control is started, the STR 26 should not be turned off, differently from a case where the brake assist is discontinued and the normal control is resumed (the STR 26 can be turned off as shown in FIG. 10).

As has been described above, in a system such as the system according to the present embodiment in which both the brake assist control and the VSC control may be executed, a problem based on the difference between the master cylinder pressure PM/C and the wheel cylinder Pw/c occurs when the control is switched from the brake assist control to the VSC control. In the brake assist control, when the emergency braking operation is detected, a unit to be coupled to the wheel cylinders 44 is changed from the master cylinder 32 to the high pressure source. In the BSC control, the wheel cylinder 44 for the controlled-wheel is joined to the high pressure source and the wheel cylinder 44** for the not-controlled wheel is joined to the master cylinder 32.

Thus, the braking force control apparatus according to the present embodiment executes the termination specifying control when the request for the VSC control occurs while the brake assist control is executed. In the termination specifying control, the wheel pressure Pw/c corresponding to the not-controlled wheel in the VSC control is decreased via the pressure decreasing solenoid SR for the not-controlled wheel. In the termination specifying control, specifically, after the request for the VSC control occurs, first, (i) the holding solenoid SH and the pressure decreasing solenoid SR corresponding to the not-controlled wheel are respectively controlled in the closed valve sate and the open valve state, next, (ii) when it is assumed that the wheel cylinder pressure Pw/c corresponding to the not-controlled wheel is controlled to an appropriately decreased pressure, the holding solenoid SH and the pressure decreasing solenoid S**R are respectively controlled in the open valve state and the closed valve state, and (iii) an assist solenoid corresponding to the not-controlled wheel out of the AS-$_1$–AS-$_3$ is then brought into the off state.

According to the above-mentioned termination specifying control, after the request for the VSC control occurs, the wheel cylinder 44** for the not-controlled wheel can be caused to communicate with the master cylinder 32 with neither affecting the controllability for the controlled-wheel in the VSC control nor causing the brake fluid having an unreasonably high pressure to flow back to the master cylinder 32. Thus, according to the braking force control apparatus according to the present embodiment, the brake assist control can be smoothly switched to the VSC control.

Figure 5:
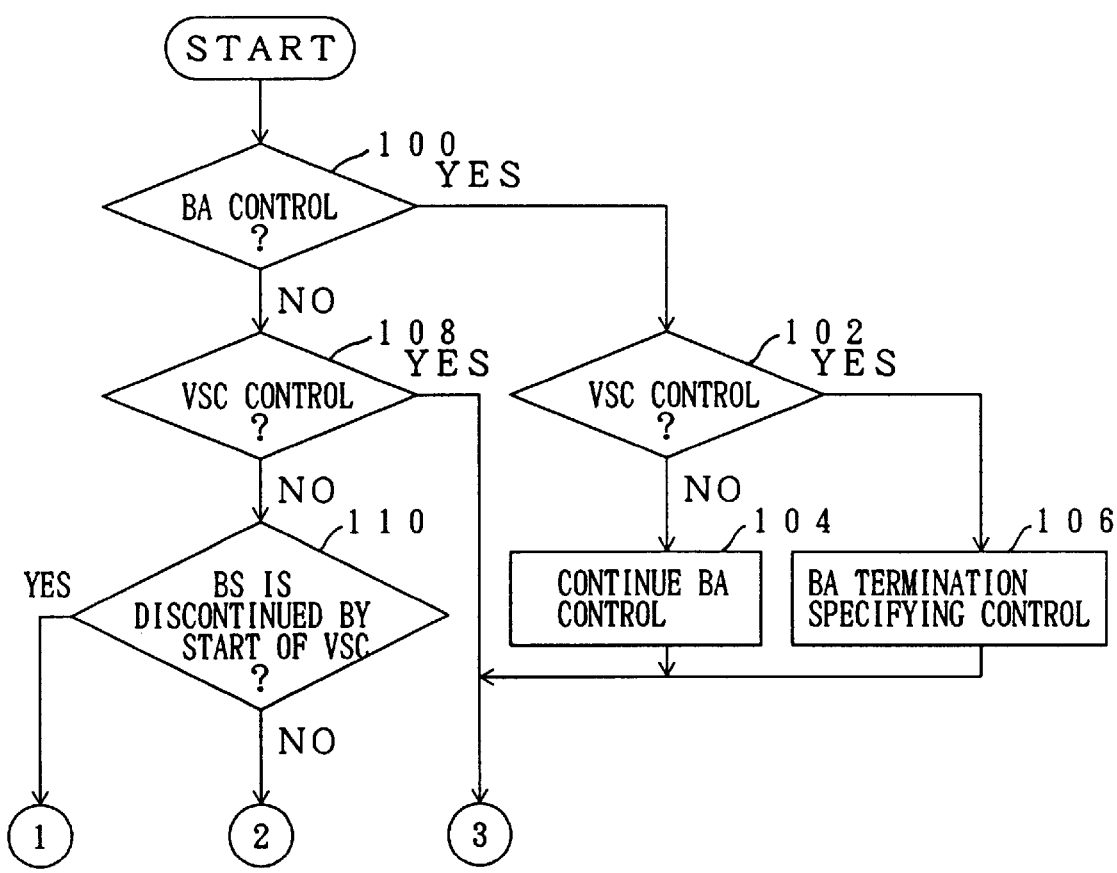
FIG. 5 is a flowchart illustrating an example of a control routine executed to determine whether the brake assist control should be carried out and needed to be terminated in a braking force control apparatus shown in FIG. 1 (1st)
Figure 6:
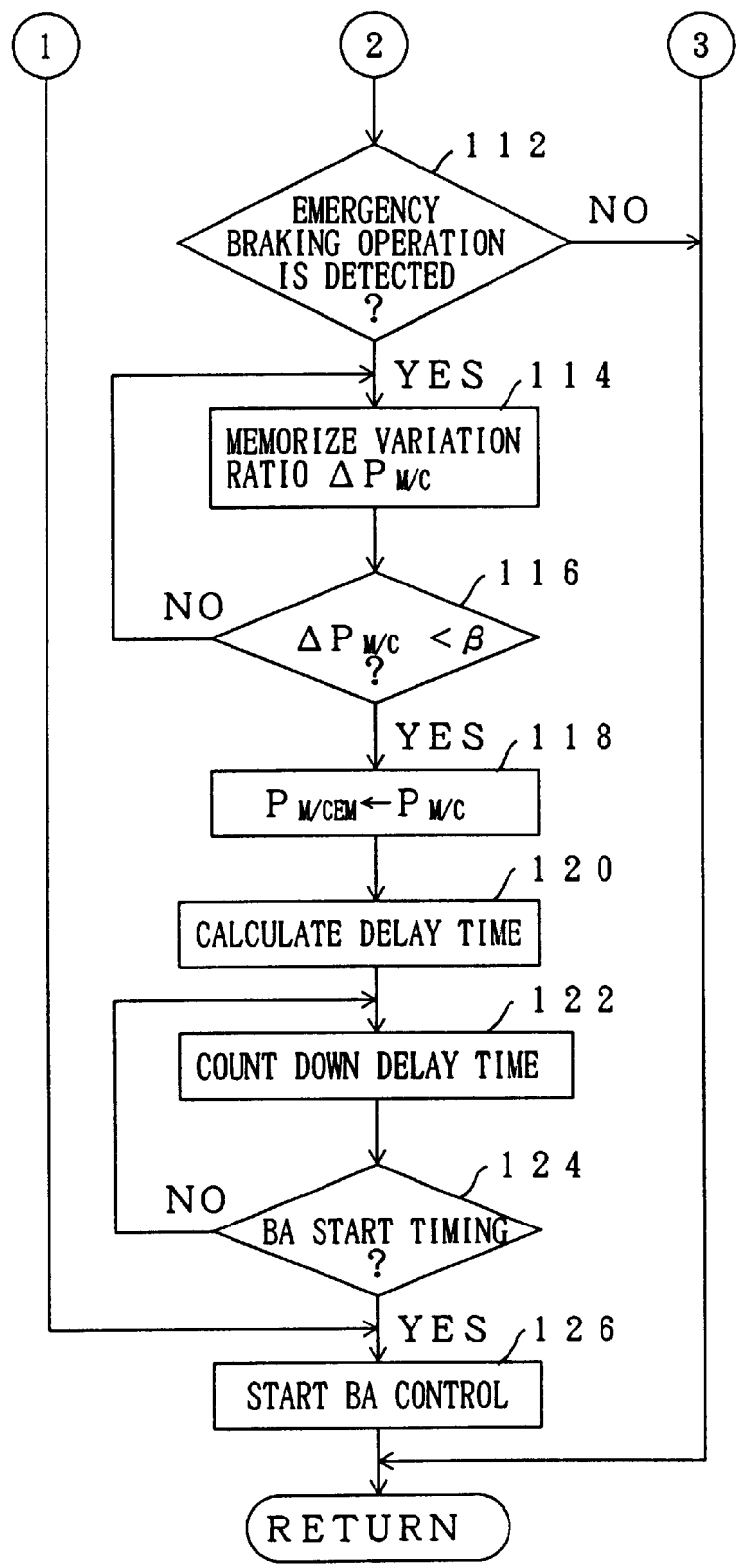
FIG. 6 is a flowchart illustrating an example of a control routine executed to determine whether the brake assist control should be carried out and needed to be terminated (2nd)
Figure 7:
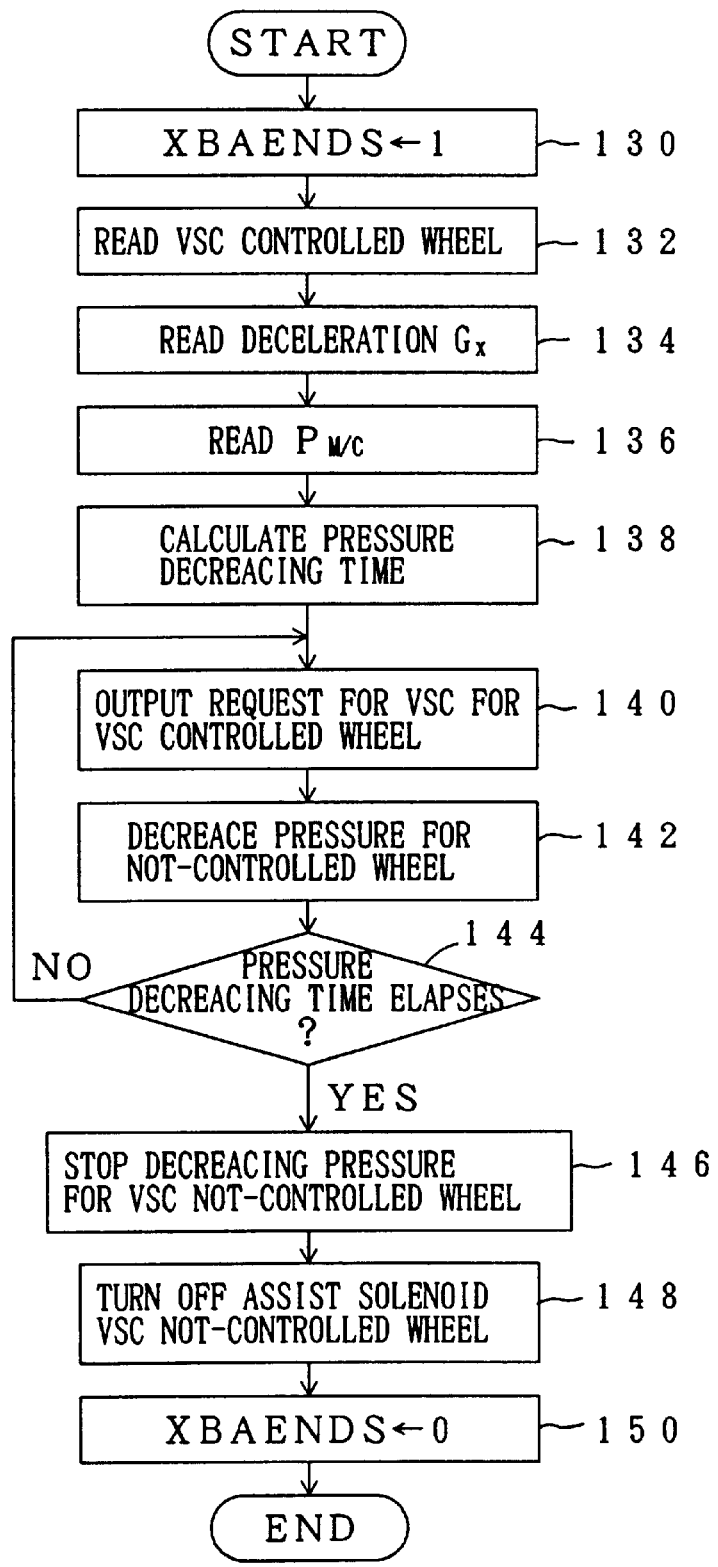
FIG. 7 is a flowchart illustrating an example of a subroutine executed to realize a brake assist termination specifying control in the braking force control apparatus shown in FIG. 1.

A description will now be given, with reference to FIGS. 5 through 7, of processes executed by the ECU 10 to implement the above-mentioned functions. FIGS. 5 and 6 show a flowchart of an example of a control routine executed by the ECU 10 to implement the above-mentioned functions. When the present routine is activated, first, step 100 shown in FIG. 5 is executed.

In step 100, it is determined whether the brake assist control is being executed. As a result, if it is determined that the brake assist control is being executed, a determination process is carried out in step 102.

In step 102, it is determined whether the VSC control is being executed. Specifically, it is determined whether a request for the VSC has occurred. As a result, if it is determined that the request for the VSC control has not yet occurred, a process is then carried out in step 104. On the other hand, if it is determined that the request for the VSC control has occurred, a process is then carried out in step 106.

In step 104, the process for continuing the brake assist control is executed. In a case where the process in step 104 is executed, the present routine is then terminated rapidly (see FIG. 6).

In step 106, the brake assist termination specifying process is carried out. Specifically, ECU 10 executes a sub routine shown in FIG. 7, so that the brake assist termination specifying process is carried out. The routine shown in FIG. 7 is activated by a request for execution of the process in step 106. When the routine shown in FIG. 7 is activated, first, a process in step 130 is carried out.

In step 130, in order to indicate that the brake assist termination specifying control is being carried out, a termination control executing flag XBAENDS is set to "1". The termination control executing flag XBAENDS is a flag which is reset to "0" when the brake assist termination specifying control is ended as will be described later.

In step 132, a wheel which should be controlled-wheel in the VSC control is read. The ECU 10 recognizes the controlled-wheel and the not-controlled wheel based on read contents.

In step 134, a deceleration Gx of the vehicle body is read. The deceleration Gx of the vehicle body is obtained by calculating a variation of an estimated speed Vso of the vehicle body for a unit time period. The vehicle is decelerated with the deceleration Gx depending on the wheel cylinder pressure $P_{W/C}$ generated in each of the wheel cylinders 44\*\*. Thus, the deceleration Gx is used as a characteristic value substituted for the wheel cylinder pressure $P_{W/C}$ generated in the brake assist control.

In step 136, the master cylinder pressure P M/C detected by the hydraulic sensor 40 at the present time, that is, a time at which the request for the execution of the VSC control occurs is read.

In step 138, a time period (hereinafter, referred to as a pressure decreasing time period $T_R$) for which the pressure decreasing solenoid S\*\*R and the holding solenoid S\*\*H provided for the not-controlled wheel in the VSC control are respectively maintained in the open valve state and the closed valve state in order to decrease the wheel cylinder pressure $P_{W/C}$ corresponding to the not-controlled wheel in the VSC to a pressure similar to the master cylinder pressure $P_{M/C}$ is calculated. The pressure decreasing time period $T_R$ is calculated in the following equation using a pressure decreasing grade α, the master cylinder pressure $P_{M/C}$ and the wheel cylinder pressure $P_{W/C}$. The pressure decreasing grade α is an eigen-value of the hydraulic passage depending on the specification of the decreasing solenoid S\*\*R, such as an effective opening area of the decreasing solenoid S\*\*R.

$$T_R = \alpha \ln(P_{W/C}/P_{M/C}) \qquad (2)$$

In the present step 138, the wheel cylinder pressure $P_{W/C}$ estimated from the deceleration Gx of the vehicle body and the master cylinder pressure $P_{M/C}$ read in the above step 136 are substituted for $P_{W/C}$ and $P_{M/C}$ of the above equation (1), so that the $T_R$ is calculated.

In step 140, an output process for controlling the wheel cylinder pressure $P_{W/C}$ corresponding to a wheel set as the controlled-wheel to a required value in the VSC control is carried out. Specifically, the processes in the accumulator pressure increasing mode ①, the holding mode ② and the pressure decreasing mode ③ are carried out for each of the controlled-wheels so that the wheel cylinder pressure $P_{W/C}$ for each of the controlled-wheels is controlled to the required value in the VSC control.

In step 142, a process for decreasing the wheel cylinder pressure $P_{W/C}$ for a wheel set as the not-controlled wheel in the VSC control is carried out. That is, the holding solenoid S\*\*H and the pressure decreasing solenoid S\*\*L provided for the not-controlled wheel are respectively brought to the open valve state and the closed valve state. When the above process is executed, the brake fluid is started to flow from the wheel cylinder 44\*\* for the not-controlled wheel to the reservoir tank 16 via the holding solenoid S\*\*H which is in the open valve state, so that the wheel cylinder pressure $P_{W/C}$ is started to be decreased.

In step 144, after the wheel cylinder pressure P W/C for the not-controlled wheel is started to be decreased, it is determined whether the pressure decreasing time period $T_R$ has been elapsed. As a result, when it is determined that the pressure decreasing time period $T_R$ has not yet been elapsed, the step 140 and the steps after the step 14 are executed again. On the other hand, if it is determined that the pressure decreasing time period $T_R$ has been elapsed, the process proceeds to step 146.

In step 146, a process for terminating decreasing the decrease of the wheel cylinder pressure P W/C for the not-controlled wheel in the VSC control is carried out. In the present step, specifically, the holding solenoid S\*\*H and the pressure decreasing solenoid S\*\*L provided for the not-controlled wheel are respectively brought to the open valve state and the closed valve state.

In step 148, a process for turning off the assist solenoid provided for the not-controlled wheel in the VSC control is carried out. When the process is carried out, a state in which the wheel cylinder 44\*\* for the not-controlled wheel is joined to the master cylinder 32, that is, a state which should be implemented in the VSC control stands. In this case, the wheel cylinder pressure $P_{W/C}$ has been decreased to a value near the master cylinder pressure $P_{M/C}$, so that the break fluid having a high pressure does not flow back from the wheel cylinder 44\*\* to the master cylinder 32.

In addition, since the wheel cylinder pressure $P_{W/C}$ has been accurately decreased to the value near the master cylinder pressure $P_{M/C}$ before the assist solenoid is turned off, when the assist solenoid is turned off, a large amount of variation of the wheel cylinder pressure $P_{W/C}$ does not occur. Thus, according to the braking force control apparatus of the present embodiment, the brake assist control can be extremely smoothly switched to the VSC control.

In step 150, the termination control executing flag XBAENDS is reset to "0". When the process in step 15 is terminated, the routine shown in FIG. 7 is terminated. In addition, when the routine shown in FIG. 7, that is, the process in step 106 shown in FIG. 5 is terminated, the routine shown in FIGS. 5 and 6 is terminated.

When the brake assist termination specifying control is executed so that the brake assist control is terminated, it is determined, in step 100 shown in FIG. 5, that the brake assist control is not being executed. When it is determined, in step 100, that the brake assist control is not being executed, the process proceeds to step 108.

In step 108, it is determined whether the VSC control is being executed. If the VSC control is being executed, it is not necessary to start the brake assist control. Thus, when it is determined that the VSC control is being executed, the present routine is terminated without carrying any processes (see FIG. 6). On the other hand, when it is determined that the VSC control is not being executed, the process proceeds to step 110.

In step 110, it is determined whether the brake assist control recently executed was terminated by starting the VCS control. As a result, if it is determined that the brake assist control recently executed was terminated by the starting the VSC control, a process in step 126 shown in FIG. 6 is executed to resume the brake assist control without condition.

In step 126, a process for starting the brake assist control, that is, a process for controlling the STR 26, $SA_{-1}$ 46, $SA_{-2}$ 48 and $SA_{-3}$ 54 in the on state is carried out. When the process is carried out, the wheel cylinder pressure P W/C of each of the wheel cylinders 44** is rapidly increased toward the accumulator pressure PACC. When the process in step 126 is terminated, the present routine is terminated.

According to the above process, when the VSC control is started after the emergency braking operation is carried, so that a large amount of braking force is prevented from being generated, the braking force can be rapidly increased after the turning action of the vehicle is stabilized and the VSC control is terminated. Thus, according to the braking force control apparatus of the present embodiment, even if the execution of the brake assist control is terminated in response to the execution request for the VSC control, a large amount of braking force can be certainly generated after the action of the vehicle is stabilized.

In addition, when it is determined, in step 110, that a cause of the termination of the brake assist control recently executed is not the start of the VSC control, that is, that the brake assist control recently executed is terminated by releasing the brake pedal 30 from the depressing operation, a process in step 112 is carried out in order to determine whether the brake assist control can be executed.

In step 112, it is determined whether the execution of the emergency braking operation is detected. Specifically, it is determined whether the master cylinder pressure $P_{M/C}$ and the variation ratio $\Delta P_{M/C}$ thereof respectively exceed predetermined values after the brake switch 84 gives out an on-output. As a result, if it is determined that the emergency braking operation has not yet executed, the present routine is terminated without executing any processes. On the other hand, if it is determined that the emergency braking operation has been executed, the process proceeds to step 114.

In step 114, the maximum value MAX $\Delta P_{M/C}$ of the variation ratio $\Delta P_{m/c}$ of the master cylinder pressure $P_{M/C}$ is memorized. Specifically, if the variation ratio $\Delta P_{M/C}$ detected at the present time in the process is greater than a value memorized as the maximum value MAX $\Delta P_{M/C}$ before the preset time in the process, the detected value at present time is memorized as a new maximum value MAX $\Delta P_{M/C}$. On the other hand, if the variation ratio $\Delta P_{M/C}$ detected at the present time is less than a value memorized as the maximum value MAX $\Delta P_{M/C}$ before the present time in the process, the maximum value $\Delta P_{M/C}$ is not updated and maintained to be memorized. When the process for memorizing the maximum value $\Delta P_{M/C}$ is terminated, a process in step 116 is carried out.

In step 116, it is determined whether the variation ratio $\Delta P_{M/C}$ of the master cylinder pressure $P_{M/C}$ is less than a predetermined value β. The predetermined value β is a threshold used to determine whether an increasing variation of the master cylinder pressure $P_{M/C}$ is loose. Thus, when it is determined that the condition of $\Delta P_{M/C} < β$ has not yet satisfied, it can be determined that the master cylinder pressure $P_{M/C}$ is rapidly being increased. In this case, the step 114 and the steps after step 114 are executed again. When it is determined that the condition of $\Delta P_{M/C} < β$ is satisfied, it can be determined that the increasing variation of the master cylinder pressure $P_{M/C}$ has bee already loose. In this case, a process in step 118 is executed. According to the above-mentioned process, the largest value of the variation ratio $\Delta P_{M/C}$ obtained until the increasing variation of the master cylinder pressure $P_{M/C}$ becomes loose after the depressing operation of the brake pedal 30 is started is memorized as the maximum value MAX $\Delta P_{M/C}$.

Meantime, the condition in step 116 is a condition which is satisfied when the increasing variation of the pressure becomes loose. Thus, whenever it is determined that the condition in the step 116 is satisfied, the master cylinder pressure $P_{M/C}$ generated in the master cylinder 32 is high.

A delay occurs until the wheel cylinder pressure $P_{w/c}$ is started to be increased after the master cylinder pressure $P_{M/C}$ is started to be increased. Thus, at a time when the above-mentioned condition in step 116 is satisfied, there is a difference between the master cylinder pressure $P_{M/C}$ and the wheel cylinder $P_{w/c}$ (hereinafter, referred to as an emergency brake pressure difference $\Delta P_{EM}$). In a case where a large amount of emergency brake pressure difference $\Delta P_{EM}$ occurs, the wheel cylinder pressure $P_{w/c}$ can be rapidly increased by using the master cylinder 32 as the hydraulic source rather than using the pump 12 and the accumulator 20 to increase the wheel cylinder pressure $P_{w/c}$ until the difference pressure $|P_{M/C} - P_{W/C}|$ is decreased to an appropriate value. Thus, in the present embodiment, when the condition in the above step 116 is satisfied, after the predetermined delay time D elapses, the brake assist control is started.

The larger the emergency brake pressure difference $\Delta P_{EM}$, the longer a time for which the wheel cylinder pressure $P_{w/c}$ is rapidly increased by using the master cylinder pressure $P_{M/C}$ as the hydraulic source. Thus, the larger the emergency brake pressure difference $\Delta P_{EM}$, the delay time D which should elapse before the brake assist control is started should be larger. In addition, the higher the master cylinder pressure $P_{M/C}$ at a time when the condition in the step 116 is satisfied (hereinafter, this master cylinder pressure is referred to as an emergency brake master pressure $P_{M/CEM}$), the larger the emergency brake pressure difference $\Delta P_{EM}$. The larger the maximum value of the variation ratio $\Delta P_{M/C}$ obtained before the condition in step 116 is satisfied after the braking operation is started, that is, the maximum value MAX $\Delta P_{M/C}$ memorized in step 114, the larger the emergency brake pressure difference $\Delta P_{EM}$. Thus, in the present embodiment, the delay time D is set based on the emergency brake master pressure $P_{M/CEM}$ and the maximum value MAX $\Delta P_{M/C}$ by the process in step 118 and steps after step 118.

In step 118, the master cylinder pressure $P_{M/C}$ detected by the hydraulic sensor 40 at the present time is memorized as the emergency brake master pressure $P_{M/CEM}$. When the process is terminated, a process in step 20 is carried out.

In step 120, the delay time D s calculated based on the emergency brake master pressure $P_{M/CEM}$ and the maximum value MAX $\Delta P_{m/c}$. Based on a map stored in the ECU 10, when both the emergency brake master pressure $P_{M/CEM}$ and the maximum value MAX $\Delta P_{m/c}$ are large, that is, when the emergency brake pressure difference $\Delta P_{EM}$ is large, the delay time D is set to a relatively long time $D_L$. On the other hand, when both the emergency brake master pressure P M/CEM and the maximum value MAX $\Delta P_{m/c}$ are small, that is, when the emergency brake pressure difference $\Delta P_{EM}$ is small, the delay time D is set to a relatively short time Ds.

When the process in step 120 is terminated, count-down of the delay time D is carried out in step 122. Then, in step 124, it is determined whether it is a time at which the brake assist control should be started, that is whether the count-down of the delay time D is completed. As a result, when it is determined that the count-down of the delay time D has not yet been completed, the processes in steps 122 and 124 are repeatedly carried out until it is determined that the count-down of the delay time is completed. When it is determined that the count-down of the delay time D is completed, the brake assist control is started in step 126 and the present routine is then terminated.

Meantime, in the above-mentioned embodiment, although a time for which the STR 26 is maintained in the off state before the AS-$_1$ 46, AS-$_2$ 48 and SA-$_3$ 54 are turned off is set to the predetermined time in the termination control of the brake assist control, the time is not limited to a constant time. That is, a time for which the wheel cylinder pressure $P_{w/c}$ is being decreased is calculated based on the deceleration Gx of the vehicle body and the master cylinder pressure $P_{M/C}$, and the time may be set as the predetermined time.

In addition, in the above-mentioned embodiment, although the time $T_R$ for which the wheel cylinder pressure $P_{w/c}$ corresponding to the not-controlled wheel in the VSC control is being decreased in the brake assist termination specifying control is calculated based on the deceleration Gx of the vehicle body and the master cylinder pressure $P_{M/C}$, the present invention is not limited to this. That is, the pressure decreasing time $T_R$ used in the brake assist specifying control may be a predetermined constant time.

Further, in the above-mentioned embodiment, it is determined, based on the master cylinder pressure $P_{m/c}$ and the variation ratio $\Delta P_{M/C}$ thereof, whether the braking operation carried out by the driver is the emergency braking operation intended by the driver or the normal braking operation. However, base parameters used for determination of the emergency driving operation are not limited to the master cylinder pressure $P_{M/C}$ and the variation ratio $\Delta P_{m/c}$.

That is, when the brake pedal 30 is operated, the brake pedaling force $F_P$ and a stroke L of the brake pedal 30 other than the master cylinder pressure $P_{M/C}$ are varied. In addition, when the brake pedal 30 is operated, so that the braking force is applied to the vehicle, the vehicle has the deceleration G. Thus, determination whether the emergency brake operation or the normal brake operation is carried out may be based on ① the master cylinder pressure $P_{M/C}$, ② the brake pedaling force $F_p$, ③ the pedal stroke L, ④ the deceleration G of the vehicle body, ⑤ the estimated speed $V_{so}$ of the vehicle body and ⑥ the wheel speed $V_W$**.

In the above-mentioned first embodiment, the pump 12 and accumulator 20 correspond to a "high pressure source" in claims, and "termination control means" in claims is implemented by the ECU 10 which executes the termination control and the brake assist termination specifying control when a termination request for the brake assist control occurs. In addition, in the above-mentioned first embodiment, the VSC control corresponds to a "stability control" in claims, and "termination specifying means" is implemented by the ECU 10 which executes the brake assist termination specifying control. Further, in the above-mentioned first embodiment, "pressure decreasing time calculation means" in claims is implemented by the ECU 10 which executes the processes in steps 134–138, and "assist control resumption means" is implemented by the ECU 10 which executes the processes in steps 110 and 126.

Figure 8:
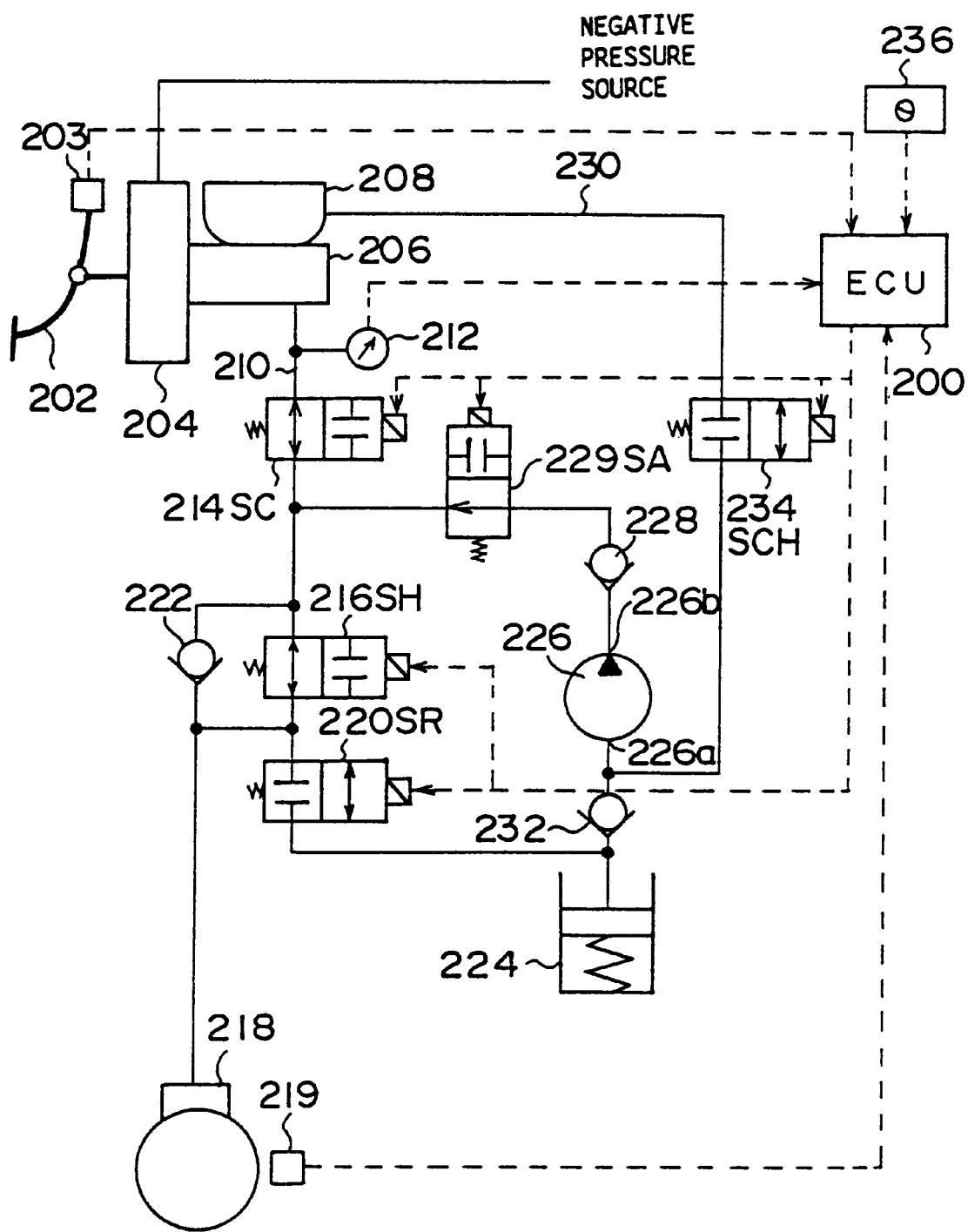
FIG. 8 is a drawing illustrating a system constitution of a second embodiment of the present invention.

A description will now be given, with reference to FIGS. 8 and 9, of a second embodiment of the present invention. In the second embodiment, the constitution of the system to be controlled differs from that in the first embodiment. FIG. 8 indicates a braking force control apparatus for only one wheel for the sake of convenience of description.

A braking force control apparatus shown in FIG. 8 is controlled by the ECU 200. The brake force control apparatus of the present second embodiment is equipped with a brake pedal 202. A brake switch 203 is disposed in the vicinity of the brake pedal 202. The brake switch 203 generates an ON output when the brake pedal 202 is pressed. The output signal of the brake switch 203 is supplied to the ECU 200. The ECU 200 determines, based on the output signal of the brake switch 203, whether the braking operation is performed.

The brake pedal 202 is joined to a vacuum booster 204. The vacuum booster 204 operates with a drive source, which is depression at a manifold of an internal combustion engine. When the brake pedaling force $F_P$ is applied to the brake pedal 30, the vacuum booster 204 generates an assist force $F_A$ having a given power ratio with respect to the brake pedaling force $F_p$. A master cylinder 206 is fixed to the vacuum booster 204. The resultant of the brake pedaling force $F_p$ and the assist force $F_A$ is input to the master cylinder 206.

The master cylinder 206 is equipped with a hydraulic chamber provided therein. A reservoir tank 208 is arranged on the upper portion of the master cylinder 206. The hydraulic chamber and the reservoir tank 208 are joined together when the brake pedal 202 is in the released state, and are isolated from each other when the brake pedal 202 is pressed. Hence, the brake fluid is supplemented each time the brake pedal 202 is released from the pressed state.

A hydraulic passage 210 is joined to the hydraulic chamber of the master cylinder 206. A hydraulic sensor 212, which generates an electric signal based on the internal pressure of the hydraulic passage 210, is disposed to the hydraulic passage 210. The output signal of the hydraulic sensor 212 is supplied to the ECU 200. The ECU 200 detects the fluid pressure generated by the master cylinder 206, namely, the master cylinder pressure $P_{M/C}$ on the basis of the output signal of the hydraulic sensor 212.

The hydraulic passage 210 is provided with a pressure cut solenoid 214 (hereinafter, referred to as an SC 214). The SC 214 is a two-positional solenoid valve which controls the hydraulic passage 210 in the conductive state or the closed state and maintains the open valve state in the normal state (an off state). The SC 214 is supplied with a driving signal from the ECU 200 and is set to be in the on state (the closed valve state). The SC 21 is provided for each wheel.

The hydraulic passage 210 is provided with a holding solenoid 216 (hereinafter, referred to as an SH 216) on the downstream side of the SC 214. The SH 216 is a two-positional solenoid valve which maintains an open state in a normal state (the off state). The SH 216 is set to be in the on state (the closed valve state) by a drive signal being supplied by the ECU 200.

The downstream side of the SH 216 communicates with a wheel cylinder 218 and a pressure decreasing solenoid 220

(hereinafter, referred to as an SR220). The SR 220 is a two-positional solenoid valve which maintains the closed state in a normal state (the off state). The SR 220 is set to be in the on state (open valve state) by a drive signal being supplied by the ECU 200. Additionally, a check valve 222 which permits a fluid flow only in a direction from the wheel cylinder 218 to the hydraulic passage 210 is provided between the wheel cylinder 218 and the hydraulic passage 210. The SR 220 and the check valve 222 are provided for each wheel.

A wheel speed sensor 219 which generates a pulse signal each time the wheel rotates a predetermined angle is provided near the wheel cylinder 218. An output signal of the wheel speed sensor 219 is supplied to the ECU 200. The ECU 200 detects a wheel speed based on the output signal of the wheel speed sensor 219.

A reservoir 224 is provided on the downstream side of the SR 220. The brake fluid flowing out of the SR 220 when the SR 220 is set to be in the on state (the open valve state) is stored in the reservoir 224. The reservoir 224 communicates with an inlet port 226a of a pump 226. The reservoir 224 and the pump 226 are provided for four wheels.

An outlet port 226b of the pump 226 communicates with the downstream side of the SC 214 in the hydraulic passage 210 via a check valve 228 and an assist solenoid 229 (hereinafter, referred to as an SA 229). The check vale 228 is a one-way valve, which permits a fluid flow only in a direction from the pump 226 to the hydraulic passage 210. In addition, the SA 229 is a two-positional solenoid valve which maintains the open valve state in the normal state (the off state). The SR 229 is set to be in the on state (the closed valve state) by a driving signal supplied from the ECU 200. The check valve 228 and the SA 229 are provided for each wheel.

A hydraulic passage 230 connected to the reservoir tank 208 is joined to the reservoir 224. A switch solenoid 234 (hereinafter simply referred to as an SCH 234) is disposed in the hydraulic passage 230. The SCH 234 is a two-positional solenoid valve, which maintains the closed valve state in the normal state (the off state). The SCH 234 is switched to the open valve state in response to a supply of the driving signal from the ECU 200. The SCH 234 is provided for the four wheels.

Further, the ECU 200 is connected with a steering angle sensor 236 which outputs pulse signals based on a rotating angle and direction of the steering wheel. The ECU 200 detects a steering angle θ based on the output signal of the steering angle sensor 236.

A description will now be given of an operation of the braking force control apparatus according to the present embodiment. In the present embodiment, the ECU 200 executes the routine shown in FIGS. 5 and 6 so as to determine whether the brake assist control should be started and necessity of termination thereof.

That is, the ECU 200 carries out the normal control under a condition in which the execution request for the brake assist control and the execution request for the BSC control do not occur. In addition, when the emergency braking operation of the brake pedal 202 is carried out under a condition in which the execution request for the VSC control does not occur, the ECU 200 starts the brake assist control. Further, when the execution request for the VSC control occurs while the brake assist control is being executed, the EUC 200 executes the brake assist termination specifying control and suspends the brake assist control. After this, when the VSC control is terminated, the ECU 200 resumes the brake assist control.

FIG. 11 indicates operation states of the respective solenoids and the pump 226 in the normal control, the brake assist control, the ABS control and the VSC control.

That is, in the braking force control apparatus according to the present embodiment, in a case where the ECU 200 executes the normal control, the SC 214, SA 229, SCH 234, SH 216 and SR220 are maintained in the off state and the pump 226 is maintained in an inactive state. Under such a condition, only the master cylinder 206 can function as the hydraulic source, and the brake fluid from the master cylinder 206 is supplied to all the wheel cylinders 218. Thus, in this case, the wheel cylinder pressure $P_{w/c}$ of the wheel cylinder 218 is adjusted to a fluid pressure obtained by applying a predetermined servo ratio to the brake pedaling force FP.

When a slip ratio S of the wheel exceeds a predetermined value after the braking operation is started, the ECU 200 starts the ABS control in the same way as the ECU 10 in the above-mentioned first embodiment. In the ABS control, while the brake pedal 202 is being depressed, that is, while the master cylinder pressure $P_{M/C}$ is appropriately increased, the SH 216 and SR 220 are driven as follows with activation of the pump 226.

When the master cylinder 204 outputs the master cylinder pressure $P_{M/C}$ being appropriately increased, the SH 216 is set in the open valve state and the SR 220 is set in the closed valve state, so that the wheel cylinder pressure $P_{w/c}$ can be increased to the master cylinder pressure $P_{M/C}$ as the upper limit. Hereinafter, this state is referred to as a master pressure increasing mode ①. In addition, under the same condition, when the SH 216 is set in the closed valve state and the SR 220 is set in the closed valve state, the wheel cylinder pressure $P_{w/c}$ can be held. In addition, when the SH 216 is set in the closed valve state and the SR 220 is set in the open valve state, the wheel cylinder pressure $P_{w/c}$ can be decreased. Hereinafter, these state are respectively referred to as a holding mode ② and a pressure decreasing mode ③. The ECU 200 executes the processes in the master pressure increasing mode ①, the holding mode ② and the pressure decreasing mode ③ so that the slip ratio S is maintained in an appropriate range.

After the depression of the brake pedal 202 is released by the driver while the ABS control is being executing, it is necessary to rapidly decrease the wheel cylinder pressure $P_{w/c}$. In the system according to the present embodiment, the check valve which permits a fluid flow from the wheel cylinder 218 to the master cylinder 206 is provided. Thus, according to the system of the present embodiment, after the depression of the brake pedal 202 is released, the wheel cylinder pressure $P_{w/c}$ of the wheel cylinder 222 can be rapidly decreased.

In the system according to the present embodiment, while the ABS control is being executed, the master cylinder 206 functions as the hydraulic source and the wheel cylinder pressure $P_{w/c}$ is increased. In addition, the wheel cylinder pressure P W/C is decreased by an outflow of the brake fluid from the wheel cylinder 218 to the reservoir 224. Thus, while the pressure increasing mode and the pressure decreasing mode are repeatedly being executed, the brake fluid gradually flows out from the master cylinder 206 to the reservoir 224.

However, in the present embodiment, while the ABS control is being executed, the SA 229 is maintained in the off state (the open valve state) and the pump is set in the active state. Thus, the brake fluid which flows out to the reservoir 224 is transmitted, with pressure, to the master cylinder 206 by the pump 226. Thus, even if the ABS control is continuously being executed for a long time, the so-called bottoming of the master cylinder does not occur.

When the predetermined delay D has elapsed after the emergency brake state requesting the execution start of the brake assist control is detected, the ECU 200, as described above, starts the brake assist control. In the system according to the present embodiment, in the brake assist control, both the SC 214 and SCH 234 are set in the on state, that is, the SC 214 is set in the closed valve sate and the SCH 234 is set in the open valve state, and the pump 226 is activated with maintaining the SA 229 in the off state.

Under such a condition, the master cylinder 206 and the wheel cylinder 218 are disconnected. On the other hand, the pump 226 transmits the brake fluid, supplied from the reservoir tank 208 via the hydraulic passage 230, to the wheel cylinder 218 with pressure. Thus, the pump 226 functions as the hydraulic source and the wheel cylinder pressure $P_{w/c}$ of the wheel cylinder 218 is increased. Hereinafter, this state is referred to as a pump pressure increasing mode ①.

After the wheel cylinder pressure $P_{w/c}$ is increased as described above, the slip ratio S of the wheel is rapidly increased and the execution condition of the ABS control is then satisfied. When the execution condition of the ABS control is satisfied, the ECU 200 carries out the processes in the above mentioned pump pressure increasing mode ①, holding mode ② and pressure decreasing mode ③ so that the slip ratio S falls into an appropriate range.

In the system according to the present embodiment, while the brake assist control is being executed, the SC 214 is maintained in the on state as described above. When the SC 214 is in the on state, the hydraulic chamber of the master cylinder 206 and the upstream portion of the SC 214 in the hydraulic passage 210 are substantially empty.

Under such a state, the master cylinder pressure $P_{M/C}$ has a value corresponding to the brake pedaling force $F_p$. Thus, the ECU 200 can easily determine, by monitoring the output signal of the hydraulic sensor 212 detecting the master cylinder pressure $P_{M/C}$, whether the depression of the brake pedal 202 is released. When it is detected that the depression of the brake pedal 202 is released, the ECU 200 stops supplying the driving signals to the SC 214 and SCH 234 to terminate the brake assist control.

Meantime, while the brake assist control is being executed, the pressure difference between master cylinder pressure $P_{M/C}$ and the wheel cylinder pressure $P_{w/c}$ occurs as described above. Thus, when the SC 214 is set in the off state so that the wheel cylinder 218 and the master cylinder 206 are joined to each other immediately after the termination request for the brake assist control occurs, the brake fluid having a high pressure may flow back from the wheel cylinder 218 to the master cylinder 206. Thus, in the braking force control apparatus according to the present embodiment, when the termination request for the brake assist control occurs, a termination control is executed before the SC 214 is set in the off state. In the termination control, the SH 216 is set in the on state (the open valve state) and the SR 220 is set in the on state (the open valve state). After the predetermined time has elapsed, the SC 214, SCH 234, SH 216 and SR 220 are then set the off state.

When the above-mentioned termination control is executed, a high fluid pressure stored in the wheel cylinder 218 during the execution of the brake assist control is supplied to reservoir 224, not to the master cylinder 206. After the pressure difference between the master cylinder pressure $P_{M/C}$ and the wheel cylinder pressure $P_{w/c}$ is decreased, the wheel cylinder 218 is joined to the master cylinder 206. Thus, according to the brake force control apparatus of the present embodiment, when the brake assist control is terminated, the high fluid pressure is not supplied to the master cylinder 206.

When the running action of the vehicle turning around is unstable, the ECU 200 executes the VSC control. That is, while the vehicle provided with the braking force control apparatus according to the present embodiment is turning around, the ECU 10 obtains an actual yaw rate γ by calculation using a vehicle model and an ideal yaw rate γ* corresponding to the vehicle speed V and a steering angle θ. When it is determined, based on the result of comparison of γ and γ*, that the vehicle is in the spin state, the ECU 200 sets an outer wheel out of the front wheel turning around as the controlled-wheel and carries out a brake fore control so that an appropriate anti-spin moment $M_{AS}$ is generated. In addition, when it is determined, based on the result of the comparison of γ and γ* that the vehicle is in the drift-out state, the ECU 200 sets an inner wheel out of the front wheels and the left and right rear wheels as the controlled-wheels and carries out the braking force control so that a spin moment Ms is generated.

A description will now be specifically given of the state of the hydraulic circuit which should be realized during the execution of the VSC control. While the VSC control is being executed, the SCH 234 is always in the on state (the open valve state), and the pump 226 is in the active state. Thus, while the VSC control is being executed, the fluid pressure from the pump 226 is always applied to the SA 229 for each of all wheels.

In the hydraulic circuit for the not-controlled wheel, the SC 214 is set in the off state (the open valve state), the SA 229 is set in the on state (the closed valve state), the SH 216 is set in the off state (the open valve state) and the SR 220 is set in the off state (the closed valve state). Under the above-mentioned condition, the wheel cylinder 218 for the not-controlled wheel is separated from the pump 226 and the reservoir 224 and joined to only the master cylinder 206. Thus, the wheel cylinder pressure P W/C depending on the brake pedaling force FP is generated in the wheel cylinder 218 for the not-controlled wheel.

In the hydraulic circuit for the controlled-wheel, the SC 214 is set in the on state (the closed valve state), the SA 229 is set in the off state (the open valve state), and the SH 216 and the SR 220 are controlled, in response to an increasing/decreasing request for the wheel cylinder pressure $P_{w/c}$ for the controlled-wheel, as follows.

That is, when an increasing request for the wheel cylinder pressure $P_{w/c}$ for the controlled-wheel occurs, the SH 216 is set to be in the off state (the open valve state) and the SR 220 is set to be in the off state (the closed valve state). Under a condition in which the SC 214 and the SA 229 are controlled as described above, the fluid pressure of the pump 226 is introduced to the upstream side of the SH 216 for the controlled-wheel. Thus, if the SH 216 and the SR 220 is respectively controlled to be in the open valve state and the closed valve state, the fluid pressure of the pump 226 is introduced to the wheel cylinder 218. As a result, the wheel cylinder pressure $P_{w/c}$ is increased to the fluid pressure of the pump 226 as the upper limit. Hereinafter, this state is referred to as a pump pressure increasing mode.

When a holding request for the wheel cylinder pressure $P_{w/c}$ for the controlled-wheel occurs, the SH 216 is set to be in the on state (the closed valve state) and the SR 200 is set to be in the off state (the closed valve state). In this case, the wheel cylinder 218 is separated from the master cylinder 206, the pump 206 and the reservoir 224. As a result, the wheel cylinder pressure $P_{w/c}$ is set to be in a holding state without being increased and decreased. That is, a holding mode ② is implemented.

When a decreasing request for the wheel cylinder pressure $P_{w/c}$ for the controlled-wheel occurs, the SH 216 is set to be in the on state (the closed valve state) and the SR 220 is set to be in the on state (the open valve state). In this case, the wheel cylinder 218 is joined to only the reservoir 224. As a result, the brake fluid in the wheel cylinder 218 is spread to the reservoir 224, so that the wheel cylinder pressure $P_{w/c}$ is decreased. That is, a pressure decreasing mode ③ is implemented.

The ECU 200 carries out the processes for the controlled-wheel in the pump pressure increasing mode ①, the pressure decreasing mode ② and thee holding mode ③ so that the actual yaw rate γ and the ideal yaw rate γ* are equal to each other. As a result, the moment restraining the spin tendency or the drift-out tendency is applied to the vehicle, and the turning action of the vehicle is corrected so that the vehicle capable of tracing the ideal running line.

Meantime, in the braking force control apparatus according to the present embodiment, when the execution request of the VSC control occurs during the execution of the brake assist control, the brake assist control is discontinued and the VSC control is started in order to preferentially stabilize the turning action of the vehicle. In such a switching, it is necessary to reverse the states of the SC 214 and SA 229 for the not-controlled wheel in the VSC control so that the hydraulic source for the wheel cylinder 218 for the not-controlled wheel is switched from the pump 226 to the master cylinder 206.

However, while the brake assist control is being executed, the wheel cylinder pressure $P_{w/c}$ for each of all wheels is higher than the master cylinder pressure $P_{M/C}$. Thus, if the hydraulic source for the wheel cylinder 218 for the non-controlled wheel is switched from the pump 226 to the master cylinder 206 after the execution request of the VSC control occurs, the brake fluid having a high pressure flows back from the wheel cylinder 218 to the master cylinder 206 via the SC 214.

Thus, when the execution of the VSC control occurs during the execution of the brake assist control, after executing the termination specifying process for decreasing the wheel cylinder pressure $P_{w/c}$ for the not-controlled wheel, the ECU 200 discontinues the brake assist control (the hydraulic source for the not-controlled wheel is switched to the master cylinder 206), in the same manner as the ECU 10 in the above-mentioned first embodiment.

As has been described above, the ECU 200 executes the routine shown in FIGS. 5 and 6 so as to determine whether the termination specifying control should be executed. When the execution of step 106 is requested in the routine shown in FIGS. 5 and 6, the brake assist termination specifying control is executed.

Figure 9:
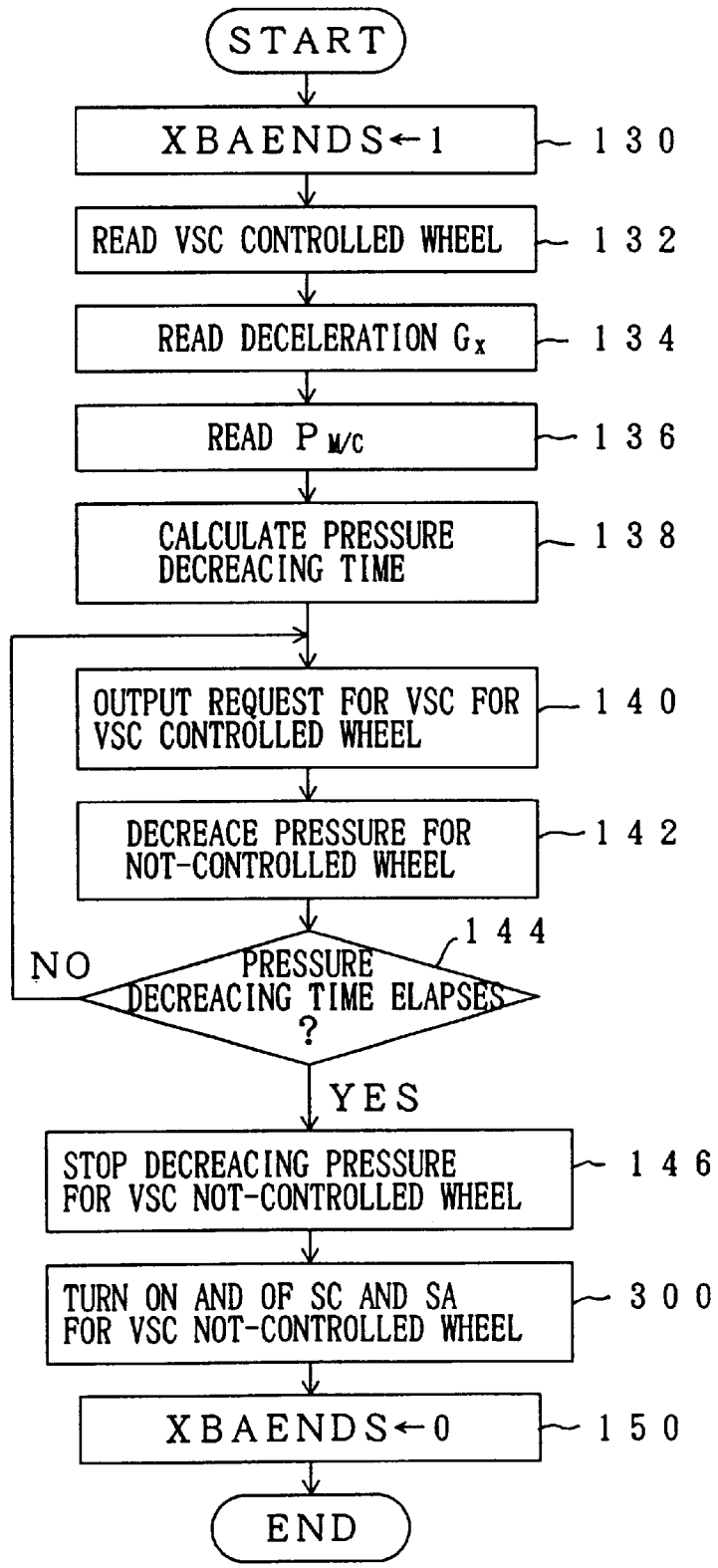
FIG. 9 is a flowchart illustrating a subroutine executed to realize the brake assist termination specifying control in the braking force control apparatus shown in FIG. 8.

In the system according to the present embodiment, the ECU 200 executes a subroutine shown in FIG. 9 so that the brake assist termination specifying control is implemented. The routine shown in FIG. 9 is similar to the routine shown in FIG. 7 with exception of a process in step 300 executed after step 146.

That is, in the present embodiment, after a pressure decreasing process for the wheel cylinder pressure P W/C for the not-controlled wheel in the VSC control is terminated (after step 146), the SC 214 and the SA 229 for the not-controlled wheel are respectively set to be in the off state (the open valve state) and the on state (the closed valve state) in step 300. After this, a state in which the wheel cylinder 218 for the not-controlled wheel is joined to the master cylinder 206 and the wheel cylinder 218 for the controlled-wheel is joined to the pump 226, which state should be implemented in the VSC control, is established.

Before the above-mentioned process is carried out, the wheel cylinder pressure $P_{w/c}$ is decreased a value close to the master cylinder pressure $P_{M/C}$, so that the brake fluid having a high pressure does not flow back from the wheel cylinder 218 to the master cylinder 206. Thus, according to the braking force control apparatus of the present embodiment, switching from the brake assist control to the VSC control can be very smoothly carried out in the same way as that in the above-mentioned first embodiment.

In the above-mentioned embodiment, the pump 226 corresponds to the "high pressure source" in claims, and the "termination control means" in claims is implemented by the ECU 200 which executes the termination control and the brake assist termination specifying control when the termination request for the brake assist control occurs. In addition, in the above-mentioned second embodiment, the "termination specifying control means" in claims is implemented by the ECU 200 which executes the brake assist termination specifying control. Further, in the above-mentioned second embodiment, the "pressure decreasing time calculation means" is implemented by the ECU 200 which executes the processes in step 110 shown in FIG. 5 and step 126 shown in FIG. 6.

As has been described above, according to the present invention, when the termination request for the brake assist control occurs, communication between wheel cylinder and the mater cylinder can be resumed after the wheel cylinder pressure is appropriately decreased. Thus, the brake assist control can be smoothly terminated without a large amount of brake fluid flowing back from the wheel cylinder to the master cylinder.

In addition, when the brake assist control is switched to the stability control, communication between the wheel cylinder and the master cylinder can be resumed after the wheel cylinder pressure for the not-controlled wheel in the stability control is appropriately decreased. Thus, according to the braking force control apparatus of the present invention, the brake assist control can be smoothly switched to the stability control without a large amount of brake fluid flowing back from the wheel cylinder to the master cylinder.

Further, before the brake assist control is terminated, the wheel cylinder pressure of the wheel cylinder joined to the master cylinder can be decreased to a pressure similar to the master cylinder. Thus, according to the braking force control apparatus of the present invention, the brake assist control can be terminated without a large variation of the wheel cylinder pressure.

Further, the brake assist control which was discontinued by start of the stability control can be rapidly resumed after the stability control is terminated. Thus, according to the braking force control apparatus of the present invention, with preference of a function for stabilizing the turning action of the vehicle, a function for generating a large braking force in an emergency case can be used.

What is claimed is:

1. A braking force control apparatus which executes a normal control and a brake assist control, said normal control using a master cylinder as a hydraulic source to increase a wheel cylinder pressure, and said brake assist control using a high pressure source as the hydraulic source to increase the wheel cylinder pressure to a pressure greater than the wheel cylinder pressure of said normal control and intercepting communication between said master cylinder and said wheel cylinder when an emergency braking operation is detected, comprising:

a termination means for restoring communication between said master cylinder and said wheel cylinder when a termination request occurs during the execution of said brake assist control, wherein, before restoring communication, said wheel cylinder pressure is decreased from said pressure greater than the wheel cylinder pressure of said normal control.

2. The braking force control apparatus as claimed in claim 1, characterized in that a stability control is executed, said stability control using said high pressure source as said hydraulic source, in a state in which the communication between said wheel cylinder for a controlled-wheel and said master cylinder, to increase a wheel cylinder pressure for the controlled-wheel so that a yaw moment is generated to stabilize an action of a vehicle body, the controlled-wheel being a wheel which should be controlled, and said termination control means comprises termination specifying control means (10) for restoring the communication between said wheel cylinder for a not-controlled wheel in said stability control and said master cylinder after the wheel cylinder pressure for the not-controlled wheel is decreased so as to discontinue said brake assist control when a request for said stabilizing control occurs during execution of said brake assist control, said not-controlled wheel being a wheel which should not be controlled in said brake assist control.

3. The braking force control apparatus as claimed in claim 1, characterized in that said termination control means comprises pressure decreasing time calculation means (10; 134–138) for calculating a time for which said wheel cylinder pressure is decreased, based on a deceleration of a vehicle body and master cylinder pressure at a time at which a termination request for said brake assist control occurs.

4. The braking force control apparatus as claimed in claim 2, characterized in that said termination control means comprises pressure decreasing time calculation means (10; 134–138) for calculating a time for which said wheel cylinder pressure is decreased, based on a deceleration of the vehicle body and master cylinder pressure obtained at a time at which a termination request for said brake assist control occurs.

5. The braking force control apparatus as claimed in claim 2, characterized in that there are further provided:

assist control resuming means (10; 110 and 126) for resuming said brake assist control after said stability control is terminated in a case where said brake control was discontinued in response to a request for said stability control.

* * * * *